(12) United States Patent
Joseph Durairaj et al.

(10) Patent No.: US 11,736,527 B1
(45) Date of Patent: Aug. 22, 2023

(54) MULTI-SYSTEM SECURITY MONITORING CONFIGURATION DISTRIBUTION

(71) Applicant: Anvilogic Inc., Palo Alto, CA (US)

(72) Inventors: Satheesh Kumar Joseph Durairaj, Dublin, CA (US); Deb Banerjee, Cupertino, CA (US); Karthik Kannan, Los Altos Hills, CA (US)

(73) Assignee: ANVILOGIC, INC., Palo Alto, CA (US)

( * ) Notice: Subject to any disclaimer, the term of this patent is extended or adjusted under 35 U.S.C. 154(b) by 207 days.

(21) Appl. No.: 17/012,842

(22) Filed: Sep. 4, 2020

(51) Int. Cl.
*H04L 9/40* (2022.01)

(52) U.S. Cl.
CPC ................... *H04L 63/20* (2013.01)

(58) Field of Classification Search
CPC ...... H04L 63/1408; H04L 63/20; G06F 9/451
See application file for complete search history.

(56) References Cited

U.S. PATENT DOCUMENTS

| | | | | |
|---|---|---|---|---|
| 6,460,141 | B1 * | 10/2002 | Olden | H04L 63/20 726/13 |
| 10,200,877 | B1 * | 2/2019 | Skidmore | H04W 16/22 |
| 10,692,032 | B2 * | 6/2020 | Datta Ray | H04L 63/20 |
| 11,055,652 | B1 * | 7/2021 | Kannan | G06N 20/00 |
| 11,277,432 | B2 * | 3/2022 | Hassanzadeh | G06F 21/577 |
| 2012/0185913 | A1 * | 7/2012 | Martinez | H04L 67/51 726/1 |
| 2012/0224057 | A1 * | 9/2012 | Gill | G06Q 10/063 348/143 |
| 2016/0080422 | A1 * | 3/2016 | Belgodere | G06N 5/048 706/47 |
| 2017/0220964 | A1 * | 8/2017 | Datta Ray | G06Q 10/0635 |
| 2019/0156257 | A1 * | 5/2019 | Datta Ray | H04L 63/1433 |
| 2020/0327223 | A1 * | 10/2020 | Sanchez | G06F 21/554 |
| 2021/0136117 | A1 * | 5/2021 | Kuppannan | H04L 63/20 |
| 2021/0146239 | A1 * | 5/2021 | Hiatt | A63F 13/335 |
| 2021/0349994 | A1 * | 11/2021 | Ravindra | G06F 21/577 |

* cited by examiner

Primary Examiner — Haimei Jiang
(74) Attorney, Agent, or Firm — Brill Law Office; Jeffrey Brill

(57) ABSTRACT

A multi-enterprise system for selecting custom high-value sets of SIEM rules for individual member enterprises communicates with member enterprises via network connections. User interfaces are implemented to enable member enterprises to access the system for search, download, and other functions. Advanced rule identification using a sophisticated security knowledge graph enhances processing efficiency and effectiveness.

20 Claims, 11 Drawing Sheets

MULTI-SYSTEM SECURITY MONITORING CONFIGURATION DISTRIBUTION

CROSS-REFERENCE TO RELATED APPLICATIONS

[RESERVED]

TECHNICAL FIELD

This disclosure relates to cybersecurity and more particularly to rule-based security monitoring.

BACKGROUND

The importance of cybersecurity measures cannot be overstated. An enterprise defending its customer's information, its assets, and intellectual property from ever-increasing new threats and variants of existing threats, from within and without, faces an increasingly difficult challenge. The responsible enterprise has many detection use-cases to research, define, and create, ultimately embodied in the logic of rules executed by its Security Information and Event Monitoring (SIEM) system. Each detection use-case and related rules play a valued and integral part of the enterprise cyber-defense. Catching up with and staying ahead of the constantly changing state of knowledge of the threat landscape and the attack surface in the enterprise environment, as well as with the global and industry trends, imposes a substantial cost of human and computing resources to the enterprise. A SIEM configured with a suboptimal rule set burns computing resources both chasing the proverbial wild goose and executing malicious code that escaped detection and removal. Advances that automate SIEM rule configuration result in enterprise computing systems that perform better with fewer resources and possess greater integrity and data security.

BRIEF DESCRIPTION OF THE DRAWINGS

The present disclosure will be understood more fully from the detailed description given below and from the accompanying drawings of various implementations of the disclosure.

DETAILED DESCRIPTION

1.0. Introduction

Figure 1:
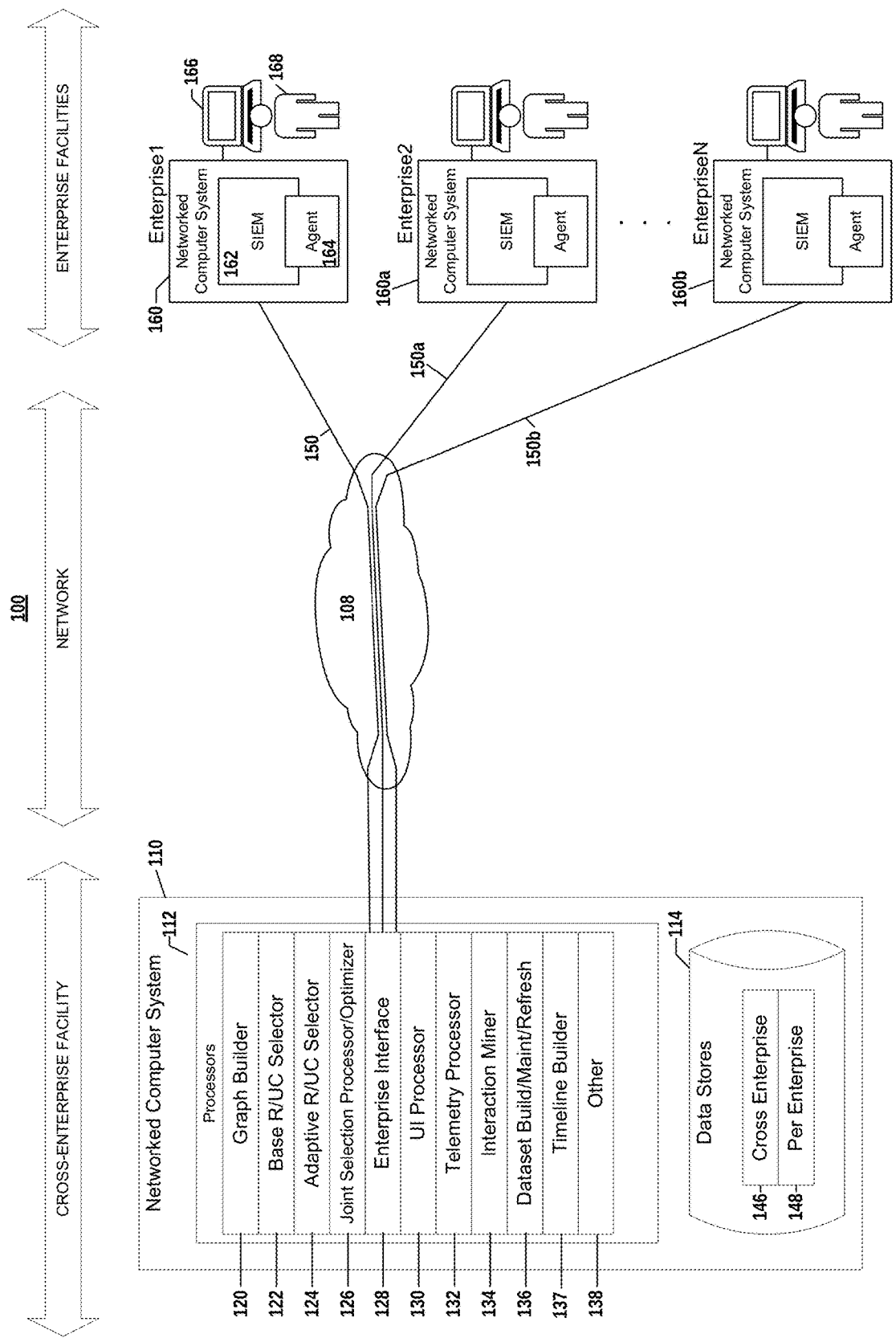
FIG. 1 is a block diagram of a system as may practice inventive aspects.

Disclosed inventive aspects permit the implementation of an electronic computing system receiving data from multiple sources including the SIEM implementations of multiple enterprises, using the data to construct a novel combination of datastores and data structures, processing that data with logic including exploitative machine learning processes and advanced exploration-based learning processes that can adapt to a shifting threat and enterprise network landscape in cybersecurity, in order to select a set of rule logic definitions ranked in specific consideration of the explicit and implicit priorities and preferences of an enterprise, which are then implemented into the control mechanisms of an SIEM to yield a more secure and resource efficient computing platform.

Inventive aspects are taught by consideration of various illustrative embodiments as may be represented in the figures and discussed in this written description. One of skill will appreciate that the illustrated and discussed embodiments are examples for the purpose of teaching and explaining the inventive aspects, and that the details discussed for the examples do not limit the many embodiments that could be implemented by one of skill to practice one or more inventive aspects.

After consideration of this disclosure, one of skill will understand and appreciate, without limitation, examples that illustrate technology to identify and select cybersecurity system rules, use cases, and detection content for deployment by a member enterprise. The rules/use-cases as may address the express needs of the enterprise (e.g., by exploitation processing as described herein) and its unknown needs and interests (e.g., by exploration processing as described herein). Embodiments will be seen that may dynamically build and maintain an enterprise profile based on preferences, searched, interactions, deployed security products, and/or other factors. Embodiments will be seen that may implement rule or entity clusters based on temporal community interactions for a given text, such as a keyword or threat name. Embodiments will be seen that may implement a shared timeline that integrates a collection of by-enterprise timelines mapping enterprise activities on the system platform and related security products, peer groups, and threat landscape changes. Embodiments will be seen that may implement a weighted security graph of security concepts, frameworks, and other entities useful to implement an in-storage representation of a candidate rule/use-case selection space. Embodiments will be seen that may implement, perhaps using one or more of the aforementioned technologies, an adaptive learning system that selects a candidate rule selection set based on a propensity factor representing known needs and an inverse propensity factor representing needs and interests unknown to the user. Embodiments will be seen that may implement a variety of functionality, including feedback, telemetry, ranking, and explanation generation. This and more will become evident by consideration of the discussion that follows.

2.0. System Overview

A useful system practicing inventive aspects may be described as a multi-enterprise security monitoring configuration distribution system (CDS) that operates to leverage information, including information from and about the SIEM-enabled computing environments of multiple independent enterprises, to direct customized SIEM configuration data to a particular enterprise. In a CDS embodiment, the customized SIEM configuration data may take the form of executable SIEM rules that, in an embodiment, maps to a use case. Embodiments described below will be seen to be adaptive systems offering the advantages of threat and security context detection aspects.

FIG. 1 is a block diagram of a CDS system as may practice inventive aspects. System 100 is shown to include networked computer system 110, identified as a cross-enterprise facility, network 108, identified as a network facility, and enterprise networked computer systems 160, 160a, and 160B, identified as enterprise facilities. Networked computer system 110 may logically be a centralized service provider system and may provide a cloud-based platform accessed both by central system administrators/operators and subscribing enterprises/organizations. Enterprise networked computer systems 160, 160, a and 160B, may logically be the IT computing infrastructure, in whole or in part, of a number of independent customers or subscribers availing themselves of service provided by the centralized service provider. Centralized service provider system 110 is shown coupled to each of the customer computing facilities 160, 160a, and 160B, via respective network connections 150, 150a, and 150B, utilizing network 108.

Each of the customer computing facilities is shown to be similarly configured. Using customer computing facility 160 as an example, a customer computing facility is shown to include a networked computing system such as 160, a user interface device such as 166, for interfacing with an authorized enterprise user such as 168, who may be a system administrator, a security information and event management (SIEM) professional, another member of a security operations center (SOC) staff, or another employee or agent, for example. Customer computing facility 160 is shown to specifically include an executing SIEM system 162 operatively coupled with agent component 164. An agent component such as 164 communicates with the service provider system via a communication channel such as 150. Communications between the service provider system and an agent component may include transmitting directions and content from the service provider system to the agent, and sending telemetry data from the agent to the service provider system, for example. Telemetry information may include operational, configuration, status, and other information regarding the SIEM and other hardware and software components of the greater networked computer system in respect to which the SIEM operates.

Service provider system 110 is shown to include processing components 112 and datastores 114. Datastores 114 is shown to further include cross-enterprise data components 146 and per-enterprise data components 148. The illustrated segregation of cross-enterprise data 146 and per-enterprise data 148 is merely to illustrate and recognize two logical classes of data that may exist in datastores 114. Cross-enterprise data 146 represents data in the system that is independent of any particular subscribing enterprise. An example may be the name of a program product such as "Windows" or "Linux," the recognized name of a security exploit in the wild such as "Backdoor123," or security research data collected from public or open sources available on the Internet. Per-enterprise data 148 represents data in the system that originates or is specifically associated with a particular subscribing enterprise. An example may be a list of the last five search terms queried by the particular enterprise, or a list of IT component product and version numbers currently operating in the networked computer system of the particular enterprise. The illustrated segregation between cross-enterprise data 146 and per-enterprise data 148 is not intended to convey any necessary physical segregation of the two classes of data although an implementation may use such physical segregation, in whole or in part, to achieve a system design objective such as data privacy. Many embodiments are possible.

Processing components 112 is shown to include graph builder 120, base RUC selector 122, adaptive RUC selector 124, joint selection processor/optimizer 126, enterprise interface 128, user interface (UI) processor 130, telemetry processor 132, interaction miner 134, dataset builder 136, timeline builder 137, and other 138. Each of the specifically identified processing components will be discussed in more detail in relation to the figures that follow. Generally identified processing component "Other" 138 conveys that a fully functional service provider system may include additional processing functionality readily understood by one of skill in the art, the extended explanation of which would needlessly burden the discussion of various embodiments disclosed herein used to effectively illustrate and teach inventive aspects.

System 100 of FIG. 1 illustrates the multi-enterprise computing environment in which inventive aspects disclosed herein may be beneficially practiced. An enterprise as discussed herein may refer to any person, organization, or entity, or subdivision or affiliate of such, as may sponsor or operate a SIEM system. An enterprise need not be a business enterprise. An enterprise, as used herein, may correspond to some identifiable unit, subdivision, affiliate, agent, or the like of a larger organization. For example, in one deployed system after the fashion of system 100 of FIG. 1, each of the 1 to N enterprise facilities may be associated with a particular division of a large corporation, and the cross-enterprise facility may be managed and operated by the corporate headquarters. Similarly, in one deployed system each of the 1 to N enterprise facilities may be associated with a regional office of a government agency, and the cross-enterprise facility may be managed and operated by the agency headquarters. Similarly, in one deployed system each of the 1 to N enterprise facilities may be associated with a subscriber or customer of a vendor offering SIEM optimization services, and the cross-enterprise facility may be managed and operated by the vendor. One of skill will appreciate that the practice of inventive aspects described herein is not limited by the particular identities, organizations, or interrelationships between and among those operating a cross-enterprise facility and those operating individual enterprise facilities.

3.0. Example Architecture

Figure 2:
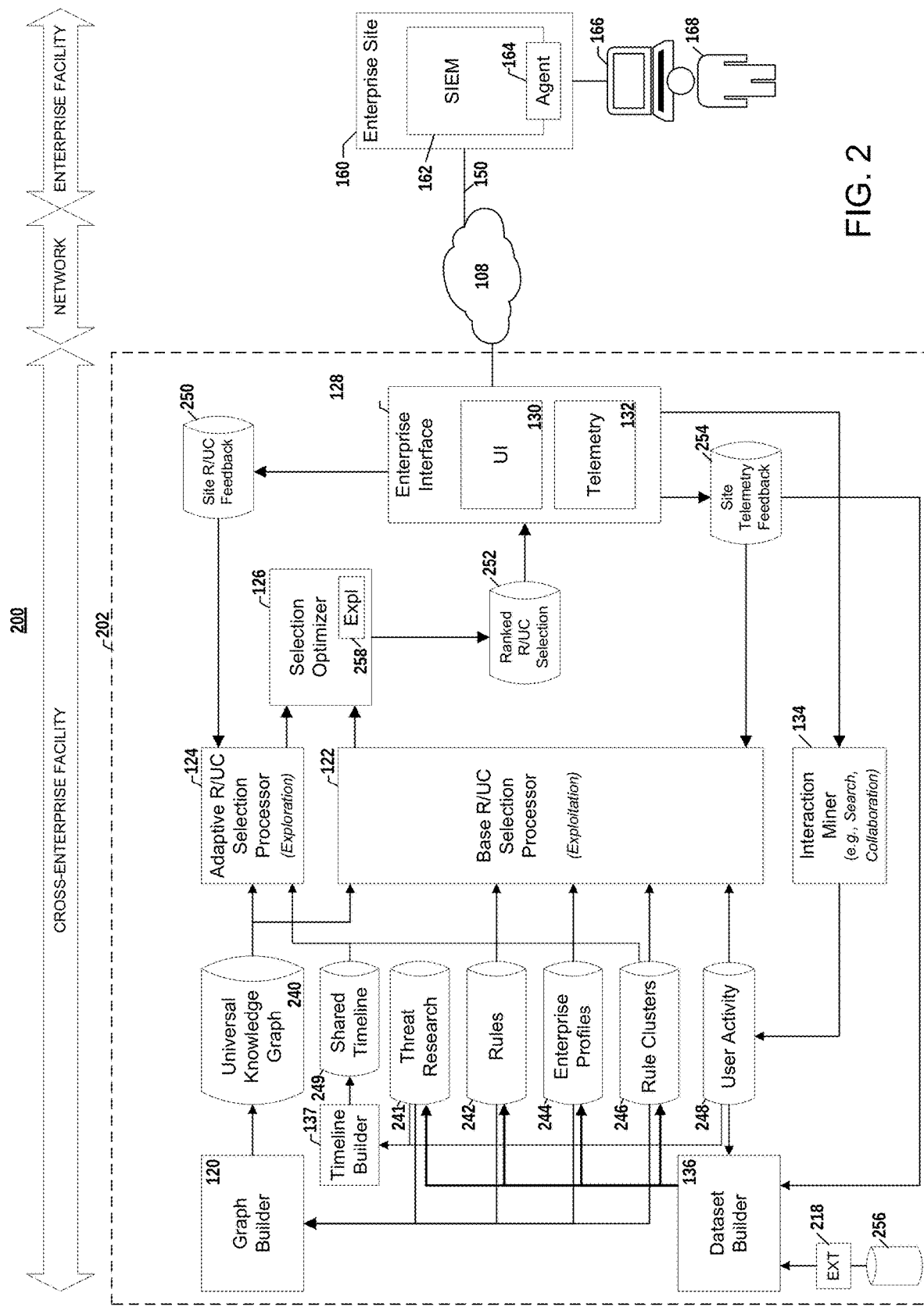
FIG. 2 is a block diagram of one embodiment of a system useful for practicing inventive aspects.

FIG. 2 is a block diagram of one embodiment of a security monitoring configuration distribution system (CDS) useful for practicing inventive aspects. System 200 is shown to include functional components 202 of a cross-enterprise facility that may be implemented as a cloud platform/service, network 108, and networked enterprise computer system 160 which includes user interface device 166 providing system access for user 168. Cross-enterprise facility functional components 202 find specific or general correspondence to components of cross-enterprise networked computer system 110 of FIG. 1, already discussed. Specific correspondence may be recognized by the use of identical reference numbers. Individual enterprise computer system 160 of FIG. 2 corresponds to the "Enterprise1" individual enterprise computer system 160 of FIG. 1, already discussed. Network 108 and network connection 150 of FIG. 2 similarly find correspondence to their identically numbered counterparts of FIG. 1, already discussed. Data components 240, 241, 242, 244, 246, 248, 249, 250, 252, 254, and 256 find their closest collective correspondence to datastores 114 of FIG. 1.

A variety of data resources are used and built to support the functional work of identifying a custom optimized set of SIEM rules to be directed to a particular enterprise subscriber. The work of building a data resource may appropriately include operations to allocate, establish, create, populate, maintain, refresh, and delete data resources in computer storage. Generally, the descriptions of data resources herein are logical, rather than physical, descriptions. What is discussed as a single data resource may be implemented in an embodiment as one or more data resources (from an operating system, file system, DBMS, or the like, point of view), each possibly spanning one or more devices and/or types of computer storage, one or more formats, one or more organizations or structures, and the like. Where particular data organizations or structures are discussed, those organizations or structures may be considered to be higher order organizations or structures, the functional attributes and benefits of which may possibly be implemented with a variety of lower order organizations or structures. An array, for example, may be implemented in one embodiment as a contiguous block of memory locations and, alternatively, in one embodiment as multiple columns of multiple tuples of a table maintained using a relational database management system (RDBMS). One of skill will appreciate by consideration of this detailed description and the embodiments discussed therein that variety may exist in regards to the implementation of a particular embodiment without departing from the inventive aspects being taught.

Rules database 242 of FIG. 2, also known as the rules corpus, contains information about the SIEM rules known to the CDS. A rule may be considered to be a piece of logic that when executed on an SIEM produces events of interest such as may be regularly monitored by a security operations Center (SOC). In one embodiment, a rule is represented in rules database 242 in computer readable form directly acceptable to the target SIEM. In one embodiment, a rule is represented in rules database 242 in human readable form that is also directly acceptable to the target SIEM. In one embodiment, rule is represented in rules database 242 in both a human readable and a computer readable form. In one embodiment, a rule is represented in rules database 242 in a computer readable form acceptable to the target SIEM, and is supplemented with annotations, metadata, and/or tags that may be used to effect a human readable description of the rule content. Many embodiments are possible.

Rules have a close relationship with use-cases. In one embodiment, rules are the basic building block used to create use-cases, and one or more rules are associated with a use-case instance to substantially define it. Use cases may be considered as the security-relevant behavior to be detected, and a related rule is an implementation for detecting the behavior identified by the use case. In one embodiment use cases may be classified into levels. A level-1, or L1, use case may relate to identifying a discrete or small scope occurrence in the enterprise computing environment monitored by the SIEM that, nonetheless, has security implications. A level-2, or L2, use case may relate to identifying a broader scope occurrence in the enterprise computing environment monitored by the SIEM that has heightened security implications. Rules may be similarly categorized based at least in part on the use cases by which they are subsumed. For example, a rule may be classified as a level-one, L1, or "threat identifier," by the association of the rule with only L1 use cases. For example, a rule may be classified as a level-two, L2 or "threat scenario," by association of the rule with an L2 use case, possibly in addition to one or more L1 rules. In one embodiment, a use-case may subsume other use-cases (such as an L2 use-case including a number of L1 use-cases), possibly in addition to rules it subsumes, and thereby be considered to include all of the rules and use-cases associated with the use-case it subsumes. The classification of a rule, such as L1 or L2, may be useful in weighting, scoring, or ranking rules for their significance to a subscribing enterprise. Such classification of a rule may also be useful in weighting, scoring, or ranking use-cases for their significance to a subscribing enterprise, perhaps by weighting, scoring, or ranking a use-case by mathematically or statistically aggregating values for all of the rules a use-case subsumes. Many embodiments are possible.

Rule database 242 may also include informational items, such as tags, properties, attributes, or the like, as may be associated with each rule and incorporated into the entry or representation of the rule in the database. In an embodiment, rules may inherit tags from related use-cases. Embodiments may vary and examples of tag data items follow. A "tactics" tag may be used to indicate a conceptual action aiming at the achievement of a security breach goal, such as "Credential Access". A "techniques" tag may be used to indicate a method to achieve a tactic, such as Kerberoasting. An "exploits/procedures" tag may be used to indicate a software that is used to achieve a specific technique, such as Powershell. Tactics, techniques, and exploits/procedures, are known in the art and often designated using the acronym "TTP." An "adversary" tag may be used to indicate a group or organization that executes TTP's for personal or national gain, such as the threat group known as APT 28, Fancy Bear, and Pawn Storm, among others. A "framework" tag may be used to indicate a cross reference to a cybersecurity standard or framework such as the MITRE ATT&CK knowledgebase of The MITRE Corporation, of McLean, Va. A "product/version" tag may be used to indicate related hardware and/or software products and their version used by the enterprise. An "use-case" tag may be used to indicate a use-case associated with the rule. A "vulnerability" tag may be used to indicate a particular weakness which can be exploited by a cyber attack with which the rule is associated. In one embodiment, such a tag may be populated with a common vulnerability and exposure (CVE) identifier, such as an identifier (e.g., CVE-2017-0263) contained in the National Vulnerability Database (NVD) of the National Institute of Standards and Technology (NIST) of the U.S. Department of Commerce, in Gaithersburg, Md. An "industry" tag may be used to indicate an industry in which the enterprise participates. These and other tags are possible. Embodiments may vary as to their use of tags and the assortment of tags supported.

In an embodiment, rules database 242 may further support associating metadata information with a rule. Embodiments may vary and examples of possible metadata items follow. An "efficacy" metadata item may be used to indicate the goodness of a rule in action. In one embodiment, such goodness may be measured by the number, proportion, or rate of false positives. A "prevalence" metadata item may be used to indicate whether the rule is deployed in an enterprise, or the extent to which the rule is deployed among some group of enterprises. A "rating" metadata item may be used to indicate a rating provided by an enterprise, subscriber, account, customer, or the like. In one embodiment, a numerical value between zero and 100 is used for the efficacy item. In one embodiment, a 0 to 5 star rating value is used. Many embodiments are possible. A "popularity" metadata item may be used to indicate the rule or associated use-case's various strengths and weaknesses, perhaps reflected as a single numerical value. A "like/dislike" metadata item may be used to indicate a like or dislike designation or value provided by an enterprise, subscriber, account, customer, or the like. A "search" metadata item may be used to indicate information about a search related to the rule that was performed by an enterprise, subscriber, account, customer, or the like. A "security concept" metadata item may map a search term to one or more related security concepts, perhaps a particular security concept that is most closely related. These and other metadata values are possible. Embodiments may vary as to their use of metadata information items and the assortment of such items supported. Supplementary data or information items as may be associated with the rule itself, i.e., the logic or process performed by the targeted SIEM, may extend beyond or as an alternative to the tag and metadata supplementary information items just described. Many embodiments are possible.

Rules database 242 may be constructed, enriched, tagged, and maintained by the functionality of dataset builder 136. Dataset builder 136 may receive data from datastores 256 maintained by an external data source 218 to construct and maintain rules database 242. Example external data sources include the MITRE ATT&CK data source, and the NIST NVD data source, already discussed. Note that external data source 218 represents one or more external data sources accessed for one or more different purposes of system 202, and is depicted as the singular 218 to avoid complicating the diagram with additional detail unneeded to convey an understanding of the content and use of inventive aspects taught herein. By extension, datastores 256 represents any datastores accessed by any of the external data sources represented by 218. Dataset builder 136 may also include user interface functionality (not separately shown) to prompt for and gather input from administrators or other functionaries of the CDS operator/provider that directly or indirectly identifies or supplies data useful for the construction or maintenance of rules database 242. Dataset builder 136, in one embodiment, may also use enterprise site telemetry feedback data 254 to construct or maintain rules database 242. In one embodiment, for example, site telemetry feedback datastore 254 may contain information about the content, implementation, use, and rating, of rules defined in the SIEM's of subscribers, such as SIEM 162, as reported to CDS 202 by enterprise agents such as 164. Many embodiments are possible. One of skill will also appreciate by consideration of this disclosure how an embodiment of dataset builder 136 may similarly be used to construct and maintain other databases, such as threat research database 241, enterprise profiles database 244, and rule clusters database 246.

Threat research database 241 may be constructed to capture externally available data that reflects and describes the state of the cybersecurity landscape in the world at large. Threat research database 241 may be constructed, enriched, tagged, and maintained by the functionality of dataset builder 136. Dataset builder 136 may receive data from datastores 256 maintained by an external data source 218 to construct and maintain threat research database 241. In one embodiment, external data source 218 in this regard is the servers of the internet that have public or open source security related data that may be freely harvested. Sources may include, for example, structured response data from formal security information sites, unstructured data from security related wikis and blogs, and any other source of data useful to developing a computer representation of the broad cybersecurity landscape. In an embodiment, this external data source is crawled to identify key security phrases and terms, for example, and their synonyms to include a virtual security lexicon and thesaurus as part of threat research data 241. In an embodiment, graph builder 120 may draw on the threat research data 241 to populate security concept nodes of security knowledge graph 240.

Enterprise profiles database 244 of FIG. 2 contains information about the individual enterprises that avail themselves of, or otherwise participate in, the CDS. In one embodiment, the profile of enterprise profiles database 244 for a particular enterprise may include information about enterprise-specific priorities, preferences, and user actions. During operation of the CDS, updates to various data items of an enterprise profile may be updated with irregular and disparate timing. For example, priority in preference data items may be updated infrequently, while updates to user action data items may occur with a high frequency. Embodiments may vary as to the categories and specific data items included in an enterprise profile. Some illustrative examples follow. In one embodiment, preferences or declaratives that may be set by an enterprise and included in its profile include the following. Data source preferences may be set by an enterprise to indicate sources of security-related data with which it is particularly concerned. For example, an enterprise may indicate that it has a high preference for security-related data regarding firewalls, such as firewall related use cases. An organization size preference may be set by an enterprise to indicate its own actual organization size or preferred size for comparison. For example, an enterprise may indicate its size to be between 100 and 500 employees. An organization industry preference may be set by an enterprise to indicate an industry in which it is classified. For example, an enterprise may indicate itself to participate in the healthcare industry. An organization product/version preference may be set by an enterprise to indicate a hardware or software component and version number deployed in its environment. Embodiments may vary as to the number and variety of preference or declarative values supported in an organization profile. In one embodiment, priorities that may be set by an enterprise and included in its profile include identifiers for one or more of any combination of techniques, tactics, exploits, and adversaries, to indicate TTP's and adversaries of interest or particular concern. Embodiments may vary as to the number and variety of priority values supported in an organization profile. In one embodiment, all of the user interactions by an enterprise with the CDS, such as search, view, rating, and deployment interactions, are included in the enterprise profile. Many embodiments are possible. In an embodiment, dataset builder 136 includes enterprise profile builder logic to build enterprise profile database 244 using information as needed from among external data sources 218, telemetry data 254, user interaction via user interfaces, captured user activity 248, and other sources. Embodiments may vary.

Rule clusters database 246 contains information about logical groups of rules that occur in patterns. In one embodiment, rule clusters database 246 contains information for logical groups of rules that occur in patterns particularly with respect to a text item (e.g. a search term, threat name, etc.). In one embodiment, rule clusters may be created by dataset builder 136 functionality that identifies patterns of common rule cooccurrence among the account-specific data for many or all of the enterprise accounts serviced by the CDS. In one embodiment, dataset builder 136 may construct a tree or tree-like data structure in computer storage for each of the enterprise accounts which organizes rule references of the enterprise, perhaps with respect to text values. In one embodiment, the enterprise account, itself, is represented as the root node for an enterprise-specific tree or the root node for an enterprise-specific subtree of a larger tree structure that perhaps encompasses the rule references of multiple, many, most, or all of the enterprise accounts serviced by the CDS. In one embodiment, branches or paths of rule-associated enterprise activity or interaction emanate from the enterprise root node. Each path may be composed of a series of nodes that each may represent a search term presented by the enterprise to the CDS or a rule identifier. In one embodiment, user interaction with a use-case may be decomposed into one or more associated rule nodes for incorporation in a tree path. In an embodiment, nodes in a branch path may include property, attribute, metadata, tag, or other descriptive data values representative of the node. For example, a rule node may include a data value to indicate whether the rule is actively deployed in the SIEM of the enterprise. Dataset builder 136 may draw on user activity data 248 produced by interaction miner 134, and site telemetry feedback data 254 produced by telemetry processor 132, to build such a tree. User activity data 248 may provide data on interaction activity of the enterprise such as search, use-case view, rule view, and rule deployment, for example. Telemetry feedback data 254 may provide data on operational SIEM activity of the enterprise such as the installation, activation, or deactivation of rules, statistics regarding uses and detections for the rule, and any other useful information. The rule cluster processing of dataset builder 136 may then traverse the many enterprise trees or subtrees to identify certain rule cluster patterns, and perhaps rule associations with search terms. In one embodiment, <key, value, probability> triplets are used in the process of recognizing rule cluster patterns. In a triplet, the key may be a search term that was employed by the enterprise for more information identifying one or more rules. In a triplet, the value may be a rule identifier designating a particular rule associated with the key. In a triplet, the probability value may be a numeric value that indicates some measure of likelihood or strength that the value rule is associated with the key condition. In one embodiment, logic that effects clustering techniques may be executed to determine closeness scores in a key and value space, and the appropriate closeness score may be used directly or via some transformation as the probability value of the triplet. In one embodiment, logic that determines count and density functions may be executed in the process of determining the probability value of a triplet. Many embodiments are possible.

Triplet occurrences may be augmented with additional property, attribute, tag, metadata, or other data values, such as the number of enterprises deployed and the number of detections produced, to enhance the processing value of the triplet and its ability to provide robust information when trying to rank the worth of one rule against another to an enterprise. An advantage of the rule clusters created in consideration of such factors as described above is their ability to capsulate relationship strength between a text and a rule/use-case and to reflect current information about real world usage of the rules, perhaps in the context of a group or cohort of other similarly-situated enterprises without compromising the privacy of any enterprise's individual data.

In one embodiment, rule cluster processing of dataset builder 136 uses a bipartite graph, word embeddings, and community detection processing to populate rule clusters data 246. A bipartite graph is created and maintained to represent associations between search terms used by CDS users and the rules viewed from the resulting searches. Word embeddings for the search terms are created that provide a numeric representation of the search term, perhaps as a vector value. The Wikipedia article on "Word Embedding" that may be found by directing an http-enabled browser to "en.wikipedia.org/wiki/Word_embedding," provides information known in the art regarding this topic. Community detection processing may be performed against the embeddings of the search terms to identify and characterize search terms that are closely related, perhaps in accordance with a system or user-specified threshold, and the logical distances between the search terms can then be used as a proxy for a proximity between rules associated with the relevant search terms, or other values or objects associated with the search terms/rules such as tags or other descriptors. The results of this processing in an embodiment may be represented, at least in part, by triplet values as previously discussed which may be reflected in rule clusters data 246. The reader may refer to the Wikipedia article on "Community structure" that may be found by directing an http-enabled browser to "en.wikipedia.org/wiki/Community_structure" which provides information known in the art regarding community detection.

Dataset builder 136 and other processing of CDS 202 may take advantage of text-to-rule associations produced during rule cluster identification to cross-populate descriptive tags or other worthwhile information within the system. For example, when an organization adds a new rule they typically may not be able to provide robust tagging and descriptive information for the rule. When the rule is added the system may cross reference an associated text value to other rules and related text values, and import/inherit their descriptive information to the new rule. This is an advantage of the aforementioned processing.

The ability of a configuration distribution system (CDS) such as 202 to provide the advantages of reflecting historic and current information about local and global, real world, cybersecurity events and processing in its produced results, with privacy, is not limited to the aforementioned case of rule clusters processing. Much of this ability is dependent on the functionality of, and associated with, enterprise interface 128. Enterprise interface 128 is the communications gateway between the CDS and its individual subscribers. Enterprise interface 128 is shown to include user interface (UI) processor component 130, and telemetry processor component 132. Telemetry processor component 132, or system telemetry processing more generally, enables the CDS to harvest information from analyst behavior to improve rule selection. In an embodiment, the functionality of enterprise interface 128 inheres processing to manage and effect communications with subscriber sites such as 160, via network connections such as 150, that traverse network facilities 108. Such communications may include user interface traffic that enables interaction between an enterprise user such as 168 and UI processing component 130. In one embodiment, UI processing component 130 is a unified component that performs subscriber-facing UI processing for all of the various functional processing blocks of system 202 as needed. In one embodiment, UI processing component 130 enjoys an implementation for some or all of its processing functions are distributed among various functional processing blocks of system 202. These and other embodiments are possible. It is noted here that UI processing component 130 belongs to enterprise interface component 128 and is discussed in terms of providing subscriber-facing UI processing. One of skill will appreciate that a system such as 202 may readily be provisioned with UI processing functionality related to the administration, operation, and control of system 202 itself, although not explicitly shown in FIG. 2. Such functionality has already been alluded to, for example, in regard to dataset builder 136 and its processing related to the construction of rules database 242.

Data arising from the processing performed by user interface component 130 may be supplied as input to interaction miner 134 in an embodiment. For example, interaction miner 134 may receive data about search terms important to the enterprise that are introduced to system 202 by a user entering data into the fields or controls of a user interface display related to search processing. Such search processing, in one embodiment, may enable an enterprise representative to search for rules or search cases that relate to a particular product, threat, or vulnerability, for example. As another example, interaction miner 134 may receive text streams reflecting enterprise interests that are introduced to system 202 by the user interacting with a user interface display related to a collaboration session. A collaboration session, in one embodiment, is an electronic communication session enabling representatives from different enterprises to chat about a topic of interest, such as a rule or use-case. Interaction miner 134 may process such input data to identify or infer useful information from the user interactions and reflect that information in computer storage as user activity data 248. For example, interaction Miner 134 may filter search term data for particular items, such as product names, and reflect that as user activity for the enterprise in 248, where it may be subsequently used by dataset builder 136 when performing processing to build or update rule clusters database 246. As another example, interaction Miner 134 may identify from collaboration dialogue a topic of high interest and reflect that his user activity for the enterprise and 248, or it may be subsequently used by dataset builder 136 when performing processing to builder update enterprise profile database 244. As another example, interaction Miner 134 may identify an association between a collaboration session and a particular rule, and may process the content of the collaboration session with logic that effects a term frequency—inverse document frequency (TF-IDF) analysis to produce a value that reflects how important a particular word may be in regards to the particular rule, and store that information as user activity data 248. A discussion of TF-IDF may be found, for example, in Rajaraman, A.; Ullman, J. D. (2011). "Data Mining"; Mining of Massive Datasets. pp. 1-17; available on the internet by directing a browser to the location /~ullman/mmds/ch1.pdf at the domain i.stanford.edu. There the stored user activity data may be subsequently used to update the entry for the rule in rules database 242 to reflect an association with the word, search term, concept, or text, and the measure of its importance. As another example, interaction Miner 134 may identify from user interface interaction data patterns of terminology, discourse, or phrasing, that suggests synonymous usage or closely related words of the enterprise which may be reflected as user activity 248 and used in subsequent processing. As another example, interaction Miner 134 may discern patterns of usage from user interaction that suggest custom tags or metadata items of particular significance to the enterprise, and reflect those as user activity data 248. In one embodiment, interaction Miner 134 may not detect patterns in user interaction across time for an enterprise but may filter and capture data relevant to such an endeavor as user activity data 248 that may be subsequently used by other processing components to detect such patterns. Many embodiments are possible.

User activity data 248 is used in conjunction with threat research data 241 by timeline builder 137 to construct shared timeline data 249. A timeline is a sequence of activities and events executed by an actor entity. An actor entity may be an enterprise, a peer group, or an adversary, in one embodiment. The timeline represents the entity's actions such as the search terms searched, the rules deployed, the ratings given, the time spent on each rule, and more. Sharing the timelines of all entities during the processing for an enterprise increases the accuracy of preferred rule selection in the direction of the entities likely real objective from the broader and deeper look. The timeline also provides a memory of sorts for texts such as search terms or security concepts of recent interest to the enterprise as these are likely to be of continued interest for some period of time into the future. In one embodiment, a user's text item of immediate interest may be searched for matches across a large set of timelines. Where matches are found temporal patterns in those other timelines may be assessed for likely applicability to the enterprise. In one embodiment, the mere match with the text item is sufficient to determine likely applicability. In one embodiment, the match with the text item in addition to some combination of corresponding events may be sufficient to determine likely applicability. Many embodiments are possible. Where likely applicability to the enterprise is determined, the temporal patterns related to the matched term are used to expand the pool of candidate rules for the enterprise's preferred selection set.

As one illustrative example, hypothetical Enterprise A shows an interest or search towards "TAT pointer." A more meaningful search can be expanded beyond that particular term using the shared timelines. The "TAT pointer" key is explored, for example, across other related entity's timeline. Exploring in this example discovers an exploit software FinFisher "modifying TAT pointers to CreateWindowEx to hook process" and FinFisher is added as a search term/path. Further exploration shows a relationship between FinFisher and a threat group, "Dark Caracal," known to use this software. Dark Caracal is added as a search term/path. In turn, exploring Dark Caracal's timeline will reveal more links and so on. The expanded associations and potential rules accumulated along the way increase the likelihood of identifying a rule to address the real security threat that prompted the original "TAT pointer" search by Enterprise A. In one embodiment, this type of recommendation has high depth score and if the recommendation with a high depth score are deployed/liked/ranked by an enterprise, it creates a local trend on the timeline, which is subsequently shared as part of the timeline.

In an embodiment, shared timeline data 249 may be represented as a table with each row corresponding to a meaningful time period such as a day, and each column corresponding to an acting entity such as an enterprise, peer group, or adversary. Many embodiments are possible.

In an embodiment, the functionality of enterprise interface 128 inheres processing to manage and effect communications with subscriber sites such as 160 which may include telemetry traffic that enables interaction between an enterprise agent such as 164 and telemetry processing component 132. In one embodiment, telemetry processing component 132 is a unified component that performs telemetry interactions with subscriber sites for all of the various functional processing blocks of system 202 as needed. In one embodiment, UT processing component 132 enjoys an implementation where some or all of its processing functions are distributed among various functional processing blocks of system 202. These and other embodiments are possible. In one embodiment, the processing performed by telemetry processor 132 effects an essentially one-way communication channel whereby the CDS receives telemetry information from its various subscriber sites, such as 160. In one embodiment, the processing performed by telemetry processor 132 may effect a bidirectional communication channel whereby the CDS receives telemetry information from its various subscriber sites, such as 160, and may send configuration, control, command, instructions, directives, and other data, to its various subscriber sites. Many embodiments are possible.

The incorporation of telemetry processing in a CDS system such as 202 provides the advantage of enriching the feature data used customize rule selection and implementation for a particular subscriber with real world operating data, including SIEM data, of the particular enterprise and of the larger community of subscribing enterprises. Such telemetry processing results in increased responsiveness of customized rule sets to changing conditions in the cyber world, focusing the computing resources consumed by an SIEM system on the likely greatest concerns, and speeding the implementation of new rules to meet new threats. Efficacy, usage, and feedback, are example classes of telemetry data that may benefit CDS operation that are collected out of the subscriber SIEM and SOC environments and reported out by an agent processing component such as 164. In one embodiment, exercise or performance of a rule or use-case by the SIEM may generate individual and/or group statistic telemetry data reported by the agent. In one embodiment, a user interaction such as may occur between an enterprise administrator user 168 and the enterprise SIEM 162 to elevate, prioritize, weight, suspend, activate, diminish, disengage, rate, or take some other action in relation to a rule or use-case may generate individual and/or group statistic telemetry data reported by the agent. Many embodiments are possible. Telemetry processing component 132, in one embodiment, takes telemetry data reported by the various enterprise agents and uses it to build site telemetry feedback datastore 254. In one embodiment, telemetry processing component 132 takes the data reported by the agents and stores it directly or with minimal processing into site telemetry feedback datastore 254. In one embodiment, telemetry processing component 132 takes the data reported by the agents and performs organizational, statistical, filtering, and/or other data processing operations to produce a useful site telemetry feedback datastore. Many embodiments are possible. The data of site telemetry feedback datastore 254 is then available for use by other processing components of CDS 202. For example, in one embodiment, dataset builder 136 uses data of site telemetry feedback datastore 254 to ascertain certain enterprise preferences or priorities, and updates enterprise profiles datastore 244 accordingly. In one embodiment, dataset builder 136 uses data of site telemetry feedback datastore 254 to characterize a rule, and updates rules database 242 accordingly. Many embodiments are possible.

In a CDS such as 202, enterprise interface 128 may include functionality that captures feedback data regarding the interactions of each subscriber with rules and use-cases to build site rule/use-case feedback datastore 250. Such feedback data may variously result from the processing of UI component 130 and telemetry component 132. In one embodiment, data of the site rule/use-case feedback datastore may include feedback data from UI component 130 related to the current or immediate interactive session with an enterprise user such as 168, to adapt the future search results and selection processing on a real time basis, such as adaptation in most cases in under approximately 3 minutes. In one embodiment, data of the site rule/use-case feedback datastore may include feedback data from UI component 130 related to the current or immediate interactive session with an enterprise user such as 168, to adapt rule search and selection processing on a near real-time basis, such as adaptation before the conclusion of the session. Many embodiments are possible.

The foregoing discussion of enterprise interface 128 and it's UI 130 and telemetry 132 components revealed functionality and data outputs that might be useful for many components of CDS 202 and, in fact, the distributed implementation of that functionality across many components of the CDS was discussed. Cohort recognition and creation processing is a similar functionality. Cohorts, as now discussed, are groupings of subscriber enterprises that are recognized to be peers in one respect or another. Certain types of cohort affinity may be easily recognized from the extent data of CDS 202 is already described. For example, each subscribing enterprise that has "healthcare" designated as its industry in its respective entry of enterprise profiles database 244 can easily be recognized as a member of a healthcare industry cohort if useful. Including processing logic in one or more components of CDS 202 to identify more subtle possible cohort groupings and the members of each has the advantage of shorter processing pathways and faster resolution of a customized rule selection set for a subscriber. In one embodiment, such a cohort creation process, or processor, implementing the logic to recognize, create, and reflect in computer storage the attributes and membership of a cohort, may be included in dataset builder 136. In such an embodiment, cohort attributes may be represented in a name designated for the cohort and the membership may be reflected among the entries of enterprise profiles database 244. In one embodiment, a cohort creation process may be included in graph builder 120 with its results reflected in knowledge graph 240. In one embodiment, a cohort creation process may be included in base selection processor 122 and/or adaptive selection processor 124, with the results created on the fly and retained in local storage. Many embodiments are possible.

The recognition and creation of cohorts with group affinities that are likely to be indicative of favorable common rule usage is of particular benefit in a CDS such as 202. For example, if cohort creation processing places two enterprises into a dynamically named and created "Windows-Mimikatz-Metasploit" cohort based on their search and collaboration interactions, for example, a rule actively deployed in the operating environment of one of those enterprises that is highly rated and productive, may provide a strong signal that the rule should be evaluated for implementation in the operating environment of the other of those enterprises. Cohort creation processors may employ clustering logic that may implement K-means scoring, for example, across a variety of feature data available in CDS 202 in order to recognize useful cohort attributes and their membership. In one embodiment, for example, clustering analysis may be performed across data representing the subscriber base and their usage levels of particular commands that may appear in their deployed SIEM rules sets in order to recognize useful cohorts and their memberships. Many embodiments are possible. In one embodiment, cohort creation may substantially or completely be based on rule/use-case factors, and perhaps related security concept factors. The cohorts may essentially embody a logical focus group. In one embodiment, cohort creation processes may tap into the processing and/or data related to rule clusters to create the focus groups.

Central to a configuration distribution system such as illustrated by CDS 202 is the processing to select a set of one or more rules determined to be particularly worthwhile to the SIEM/SOC operation of a subscribing enterprise, and to facilitate implementation. Processing components depicted for CDS 202 implement a bimodal approach to the determination of a rule selection set. Base rule/use-case selection processor component 122 of CDS 202 of FIG. 2 implements an exploitation mode of rule selection set determination whereby known preferences and priorities are used as the result objective while creating an optimization function, such as may be found in the rules 242, enterprise profiles 244, rule clusters 245, user activity 248, site telemetry feedback 254, and other databases, is exploited by learning processes to make a determination. In one embodiment, such learning processing may emphasize logic that implements supervised learning and certain unsupervised learning models. Adaptive rule/use-case selection processor 124 of CDS 202 of FIG. 2 implements an exploration mode of rule selection set determination that may emphasize logic that implements exploration, recommendation, reward based processing methods like, but not limited to, reinforcement learning models in the production of its selection set. Both the base 122 and adaptive 124 selection processors of the illustrated embodiment are informed by knowledge graph 240 which is illustrated and discussed more fully in relation to FIG. 3. Knowledge graph 240 of FIG. 2 is illustrated as being constructed and maintained by graph builder 120. The processing of graph builder component 120 may draw on many sources of data available within CDS 202, such as rules database 242, enterprise profiles database 244, and rule clusters database 246, to construct and maintain knowledge graph 240. Many embodiments are possible and graph builder 120 is not constrained to the data sources used to construct the knowledge graph 120 by the illustrated examples, as is generally true.

The bimodal selection sets produced by base selection processor 122 and adaptive selection processor 124 are inputs to the processing performed by selection optimizer 126. Selection optimizer 126 operates to produce a ranked rule/use-case selection customized for a subscribing enterprise. Selection optimizer 126 may perform filtering, scoring, sorting, comparing, ranking, ordering, and other data processing operations against the input selection sets to produce a user-ready customized rule selection 252. In an embodiment, selection optimizer 126 may include explanation generator 258 to create coded or human-readable explanations describing factors that contributed to the inclusion of a rule/use-case in the selection set. Explanations produced by explanation generator 258 may be included in the ranked rule/use-case Selection data 252 in association with corresponding rules/use-cases. In one embodiment, the explanation generator emphasizes factors about the relevance of a particular rule in terms of the related threat landscape which information may be sourced from the security knowledge graph and/or other sources. The customized rule selection set 252 may advance toward implementation processing performed by enterprise interface 128.

In one embodiment, UI component 130 is involved in the implementation processing and may perform operations to create UI display presentations to an enterprise user such as 168 with indications of the customized selection 252. Such UI display presentations may be used in an embodiment to implement a human-driven checkpoint in the implementation process. Such UI processing may be used in an embodiment to solicit and SIEM administrators explicit request, direction, command, approval, or disapproval of implementation of rules in the customized selection set, individually or as a group. In one embodiment, telemetry component 132 is involved in implementation processing and may perform operations to convey rule content and related metadata, commands, instructions, directives, or such to the enterprise site to effect the loading, storage, management, staging, installation, activation, or other operation in respect of the set of rules of customized rule selection 252, in whole or in part. Many embodiments are possible.

The CDS 202 of FIG. 2 is shown to include timeline builder 137 producing shared timeline 249 used by adaptive rule/use-case selection processor 124. In an exploitation-based approach, if Enterprise A deploys Rule-1, Rule-1 is recommended to Enterprise B in the same peer group as Enterprise A. The shared timeline used in an exploration-based approach may be seen to go deeper to find the reason and reciprocate to a cohort or other enterprises having similar events in their timelines.

3.1. Knowledge Graph

Figure 3:
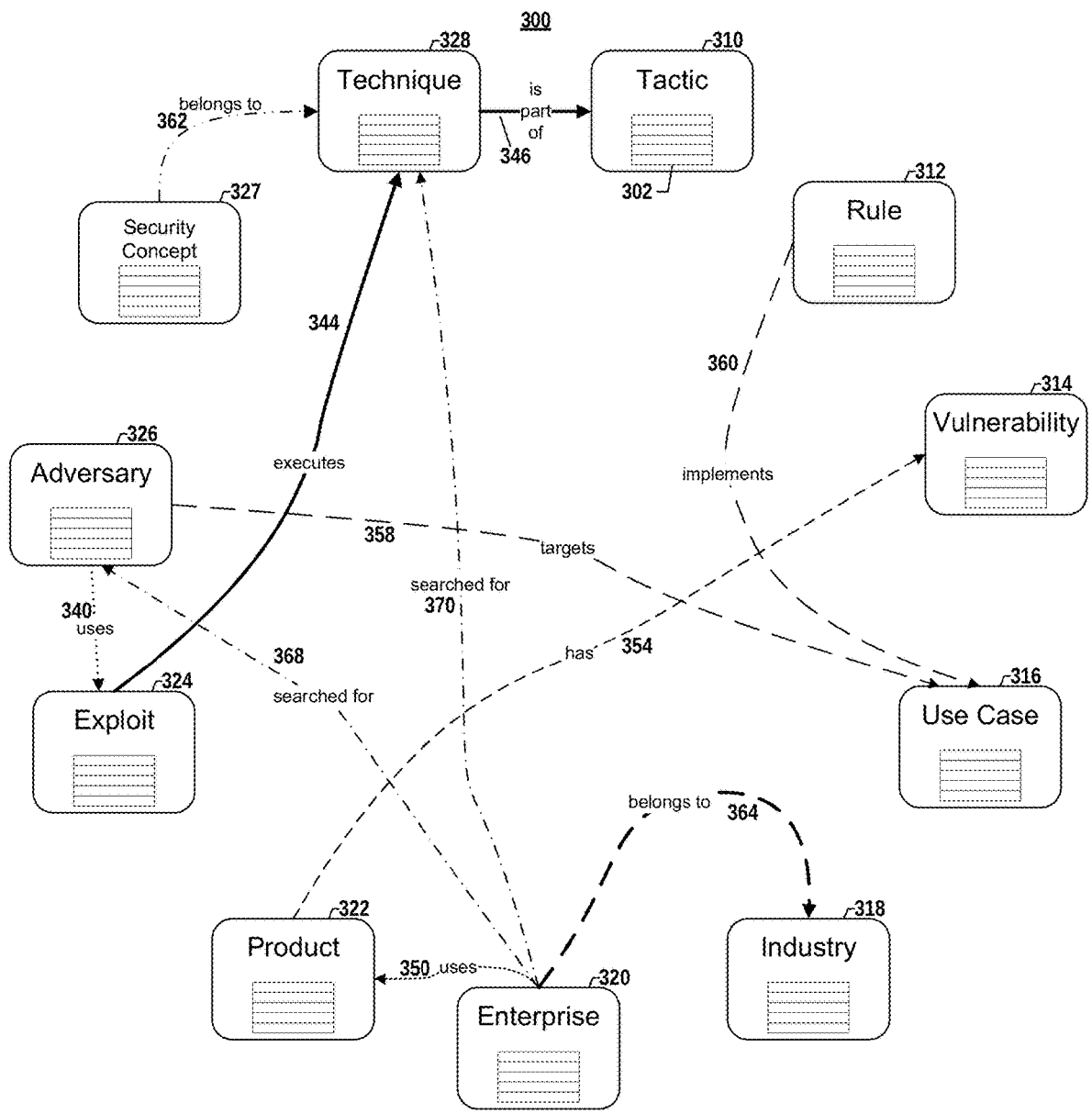
FIG. 3 depicts a knowledge graph specification as may be useful in the practice of inventive aspects.

FIG. 3 depicts a knowledge graph specification as may be useful in the practice of inventive aspects. Graph model 300 of FIG. 3 depicts the node types that are used in one illustrative example of a security knowledge graph and the edge types that are used to represent relationships that exist between node type instances. In one embodiment, combinations of edge types may be grouped into different logical layers that each represent a specific subset of the knowledge domain of the considered security landscape. The different node types of the knowledge graph each represent a different type of security entity that is recognized within the knowledge domain represented by the graph. Graph model 300 depicts types of entities (nodes) and relationships (edges) that are available to build a working graph, and a constructed graph is likely to contain many instances of each of the node and edge types. A security knowledge graph built in this fashion is useful in the CDS to explore relevant interests of an enterprise. For example, the security graph can be traversed to determine direct and indirect interests, and to learn from enterprise grouping. One of skill will come to appreciate the many paths of exploration and association that are possible in a system that exploits a security knowledge graph after the fashion of the example specified in FIG. 3. Edges as may be utilized between nodes of the same type are not shown but can be appreciated by one of skill in the art. For example, edges may be used in a graph instance between multiple security concept nodes such as 327 to represent a "relates to" or "is close to" relationship between the concepts represented by the nodes. One of skill will appreciate the number of graphs, subgraphs, graph layers, and such as may be constructed using node and edge types as depicted in FIG. 3, and the robust pathways for exploring relationships provided thereby.

Graph model 300 of FIG. 3 is shown to include tactic 310, rule 312, vulnerability 314, use-case 316, industry 318, enterprise 320, product 322, exploit 324, adversary 326, security concept 327, and technique 328 nodes or node type designations. Each node, such as tactic node 310 is illustrated with the node type name, e.g., "Tactic", and a compartmentalized block, e.g., 302, used to illustrate attribute, property, tag, metadata, and other data items, that may be included in a node representation in computer storage to describe or characterize a node instance. In one embodiment, descriptive data such as 302 may include a set of one or more data items that is common to all node types. In one embodiment, descriptive data such as 302 may include a set of one or more data items uniquely used for the associated node type. In one embodiment, descriptive data such as 302 may include data items that are common to all node types as well as data items that are tailored to the particular node type. Many embodiments are possible. Instances of the edge types depicted for graph model 300 may similarly be implemented with their own attribute, property, tag, metadata, and other data items, although these are not specifically shown in FIG. 3. Confidence level, risk score, impact value, and version identifier are but a few examples of the data items that may be used to descriptively annotate nodes or edges of a security knowledge graph.

Tactic 310, technique 328, and exploit 324 nodes are used to represent the elements of the cybersecurity TTP trilogy—tactics (or, tools), techniques, and procedures (or, exploits). TTP's are understood in the art and get at how threat agents orchestrate and manage attacks. Combinations made by edges established among these three node types are useful to denote patterns of activities or methods by attackers, which patterns may often come to be associated with one or more specific attackers or adversaries.

According to graph model 300, an "executes" edge 344 may express a relationship between an exploit node type instance and a technique node type instance 328. Similarly, an "is part of" edge 346 may express a relationship between a technique node type instance 328 and a tactic node type instance 310. One of skill will recognize by the illustration that each of the edge types shown for graph model 300 is a directed edge for the relationship (as indicated by the terminal arrowhead). Instances of edge types 344 and 346, along with the instances of node types 324, 328, and 310, they connect logically form a TTP framework layer. In an embodiment, much or all of the content of the TTP framework layer of a working graph may have been populated with information imported from a known TTP framework provider, such as MITRE. The logical TTP framework layer may accordingly be considered to represent the cybersecurity knowledge of a TTP framework or kill chain.

Instances of security concept node type 327 effectively tie security concept terminology into the TTP framework via "belongs to" edges such as 362 that relate security concepts to techniques. In one embodiment, a security concept as represented by a security concept node 327 is a text string or item that identifies a security concept. "Network security" may be one such example. One use for security concepts is thus to identify classifications or categories, broad or narrow, particularly those that are not appropriately represented by another node type, although embodiments may vary. One use for a graph of security concept nodes is to provide a pathway from a given concept to one or more others that are close in relationship by some measure so that rules/use-cases associated with those nearby nodes can be explored as preferred rule candidates during a search. In an embodiment, the use of such security concept nodes, graphs, and sub-graphs, can be particularly effective at establishing a computer-readable relationship between the rules/use-cases of an enterprise SIEM and threat research knowledge, for example, that can represent the experiences of perhaps millions of computing installations and devices across the globe. In an embodiment, graph builder 120 of FIG. 1 may draw on the threat research data 241 to populate security concept nodes 327 of FIG. 3.

Instances of role node 312 in a graph may each represent an SIEM rule and may be populated by graph builder 120 of FIG. 2 into the graph using information from rules database 242. Instances of vulnerability node 314 of FIG. 3 in a graph each represent a particular point of attack in the cyber environment. A vulnerability may be considered to be a weakness in the computational logic (e.g., code) found in software and hardware components that, when exploited, results in a negative impact to confidentiality, integrity, or availability of a computing system. In one embodiment, instances of vulnerability node 314 is each identified by a common vulnerability and exposure (CVE) identifier from the NIST NVD database. Many embodiments are possible.

Instances of use-case node 316 in a graph may each represent a use-case as earlier discussed which may provide context, goal, or objective information. Example use-cases may relate to data system activities concerning authentication, account management, network connections, policy adjustments, threat detection, anomalous behaviors, auditing, and others. In one embodiment, graph builder 120 of FIG. 2 may use use-case information from rules database 242 to populate knowledge graph 240 with appropriate use-case nodes 316 of FIG. 3.

Instances of industry node 318 in a graph may each represent and industry classification in which one or more subscribing enterprises may participate. Instances of enterprise node 320 in a graph may each represent a past, present, or referential enterprise that did, does, or could participate in the CDS subscriber base. In one embodiment, graph builder 120 of FIG. 2 may use industry information found in enterprise profiles database 244 to populate knowledge graph 240 with appropriate industry nodes 318 of FIG. 3.

Instances of product node 322 in a graph may each represent a product or product version of a hardware or software component that may be deployed in an enterprise computing environment. Some examples of computing environment components that may be represented as product nodes in a security information graph include hardware devices, hardware systems, software components, deployed security products, network communications software components such as an IP stacks and stack components, security stacks and stack components, and other software stacks and stack components such as might be architected between an operating system and an endpoint application. In one embodiment, graph builder 120 of FIG. 2 may use product information found in enterprise profiles database 244 to populate knowledge graph 240 with appropriate product nodes 318 of FIG. 3. In one embodiment, a graph may contain a product node for each product/version combination, such that a product node is essentially a product-version node. In one embodiment, a graph may contain a product node for each product, with version information represented in an edge such as 350 that connects it with a using enterprise. Many embodiments are possible.

Instances of adversary node 326 in a graph may each represent an entity such as an organization or national government engaging in cyberattack activity. In one embodiment, graph builder 120 of FIG. 2 may use adversary and adversary relationship data available from open source frameworks to populate knowledge graph 240 with appropriate adversary nodes 318 and associated edges of FIG. 3. MITRE is an example of such an open source framework. In one embodiment, graph builder 120 may also include user interface support to allow a CDS administrator, for example, to curate, edit, or augment data from an open source framework. Many embodiments are possible.

Just as instances of certain node types and certain edges among them formed a logical TTP layer according to graph model 300 as earlier described, other combinations of node types and edges are shown to implement additional logic layers of graph model 300. Instances of adversary node type 326, instances of exploit node type 324, and instances of "uses" edge type 340 that represent relationships among them may together form a logical adversary layer of a graph. Instances of enterprise node type 320, instances of product node type 322, and instances of "uses" edge type 350 that represent relationships among them may together form a logical infrastructure layer of a graph. Instances of product node type 322, instances of vulnerability node type 314, and instances of "has" edge type 354 that represent relationships among them may together form a logical vulnerability layer of a graph. Instances of rule node type 312, instances of adversary node type 326, instances of use-case node type 316, and the instances of "targets" edge type 358 and "implements" edge type 360 that represent relationships among them may together form a logical rule layer of a graph. Instances of enterprise type node 320, instances of industry type node 318, and instances of "belongs to" type edge 364 that represent relationships among them may together form a logical industry layer of a graph. Instances of enterprise type node 320, instances of adversary type node 326, instances of technique type node 328, and instances of "search for" type edges 368, 370 that represent relationships among them may together form a logical enterprise behavior mode of a graph.

Graph model 300 of FIG. 3 illustrates nodes, edge types, and layers for one embodiment of a security knowledge graph, and many embodiments are possible. The use of the security knowledge graph in a configuration distribution system such as CDS 202 of FIG. 2 has the advantage of providing short and efficient paths to rules that may usefully be implemented in an enterprise SIEM. Such a security knowledge graph may also have the advantage of providing a dense representation of entities and relationships that may serve as a robust and efficient source of feature data for advanced explorations aimed at identifying the most valuable rules for deployment in an enterprise SIEM. In an embodiment, artificial intelligence (AI) and machine learning (ML) methods may be beneficially integrated into the logic of the CDS to mine the rich entity-relationship data of a security knowledge graph to identify insights and trends far more quickly than an SOC analyst typically could. The identified insights and trends can be used to improve the selection of the most worthwhile rule deployments for an enterprise, and to move that selection towards deployment sooner, reducing the risk exposure of the enterprise both in terms of severity and time. In an embodiment, a CDS may utilize a security knowledge graph apart from any applied AWL processing to great benefit. The CDS may include logic implementing any of a variety of graph navigation and traversal techniques to ultimately lead to a useful rule identification for an enterprise. For example, CDS logic may navigate from the enterprise node representing the subject enterprise to its associated industry node and then to other enterprise nodes for enterprises in the same industry. A large incidence of relationships between those other enterprise nodes and a particular adversary node may provide a promising lead to a use-case node associated with a worthwhile rule node.

It will be appreciated by consideration of the foregoing that a security graph such as one embodied in accordance with graph model 300 of FIG. 3 can provide a number of intertwined layers including representations for a rule/use-case layer with their relationships to entities in other layers, a layer expressing an enterprise's behavior across rules and use-cases, and a layer representing TTP framework information and associated security concepts. The construction and maintenance of such a graph provides an effective mechanism for identifying effective, customized rule selections with great computing resource efficiency at practical speeds, representing advantages of embodiments practicing inventive aspects.

4.0. Processing Overview

Figure 4:
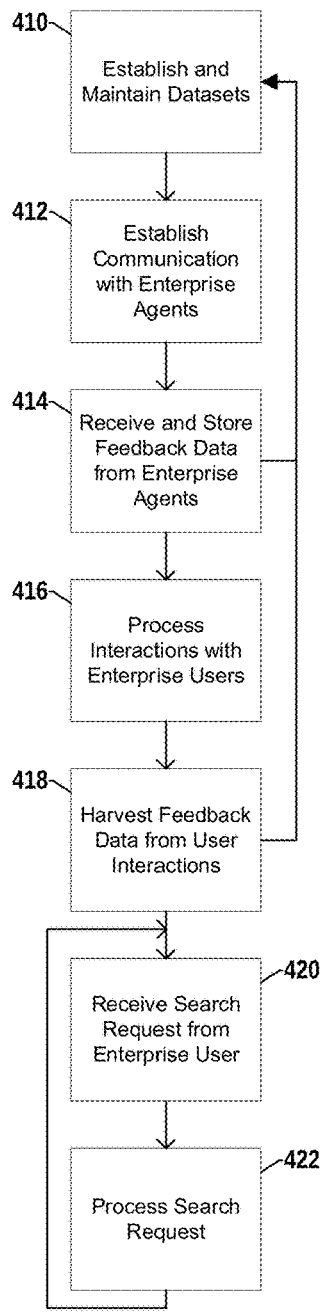
FIG. 4 is a system flow diagram of one embodiment.

FIG. 4 is a system flow diagram of one embodiment. System process flow 400 of FIG. 4 illustrates a high level view of the implementation and use processing for a security monitoring configuration distribution system such as CDS 202 described earlier in relation to FIG. 2. At block 410 of FIG. 4, processing is performed to establish and maintain datasets necessary to the operation of the CDS. The processing of block 410 may include processing earlier described in relation to dataset builder 136, interaction miner 134, and graph builder 120, of FIG. 2, for example.

At block 412 of FIG. 4, processing is performed to establish communication channels with enterprise agents of the subscriber base. Such communication channels are exemplified by illustrative communication channels 150, 150a, 150B of FIG. 1 that each provide a communication pathway between enterprise interface 128 of the CDS system and a respective enterprise system 160, 168, and 160B, via network 108. A logical communication channel, such as 150, may include a diverse combination of logical and physical communication facilities (e.g., IP stacks, routers, DSL lines), and may embody a number of independent sessions, connections, subchannels, or such. In one embodiment, Internet protocol (IP) connections are made between an agent and enterprise interface using IP packets, secure protocols, local LAN, and intervening WAN and Internet facilities and physical infrastructure.

At block 414 of FIG. 4, processing is performed to receive and store feedback data from the enterprise agents using the connections established at block 412. The processing of block 414 may include processing earlier described in relation to enterprise interface 128, user interface (UI) component 130, telemetry component 132, and interaction miner 134 of FIG. 2.

At block 416 of FIG. 4, processing is performed to engage in interactions with enterprise users. Such interactions may include the conduct of searches or collaboration sessions, for example. The processing of block 416 may include processing earlier described in relation to user interface component 130 of enterprise interface 128 of FIG. 2, for example. Processing conducted at block 416 of FIG. 4 may represent a subscriber's chief interest in participating in the service, particularly as it relates to identifying a high-value set of SIEM rules to implement on site. During the processing of block 416 and possibly at some time afterward, the processing of block 418 may ensue to gather information useful to efficiently and effectively identify that high-value set. At block 418, processing is performed to harvest feedback data from user interaction sessions. The processing of block 418 may include processing earlier described in relation to user interface component 130 of enterprise interface 128, and interaction miner 134 of FIG. 2.

The processing just described for blocks 410 through 418 prepares, updates, and upgrades the condition of the CDS for generating high-value, customized rules selection sets for individual subscribers. Generally, the greater the period of time and the greater the number of subscribing enterprises over which such processing is performed, the better positioned the CDS may be to make refined and effective customized rules selection sets. The production of such customized rules selection sets may generally occur in an embodiment during the processing next described.

At block 420 of FIG. 4, processing is performed to receive a search request from an enterprise user. In one embodiment, the search request may be received via user interface processing. In one embodiment, an enterprise user such as user 168 of FIG. 2 may engage a user interface implemented by UI component 130, to enter a search request. In one embodiment, the user interface may include a display such as depicted in and later discussed in reference to FIG. 8, which enables an enterprise user to submit a search request. In one embodiment, the search request may be received via an automated process, such as agent 164 of FIG. 2, which may exercise an application programming interface (API) exposed by enterprise interface 128. These and other embodiments are possible.

At block 422 of FIG. 4, processing is performed to respond to the type of search request received at block 420. The processing of block 422 may include processing earlier described in relation to base selection processor 122, adaptive selection processor 124 and selection optimizer 126 of FIG. 2. The processing of block 422 may include processing described subsequently in relation to FIG. 5, for example. Processing of a search request at block results in the production of a customized rules selection set for an enterprise and may include processing directed to the implementation of the rules selection set, in whole or in part, on the enterprise SIEM. System flow 400 of FIG. 4 illustrates that the production of customized rules selection sets and their implementation is an iterative process by an arrow showing control flow returning to block 420 after the performance of block 422. One of skill in consideration of the foregoing will readily appreciate that much of the processing described in relation to blocks 410 through 418 may also be ongoing, continuous, or iterative, and that processing perhaps described in relation to a single enterprise user is actually repeatedly performed for the many enterprise subscribers.

5.0. Search Processing Examples

Figure 5:
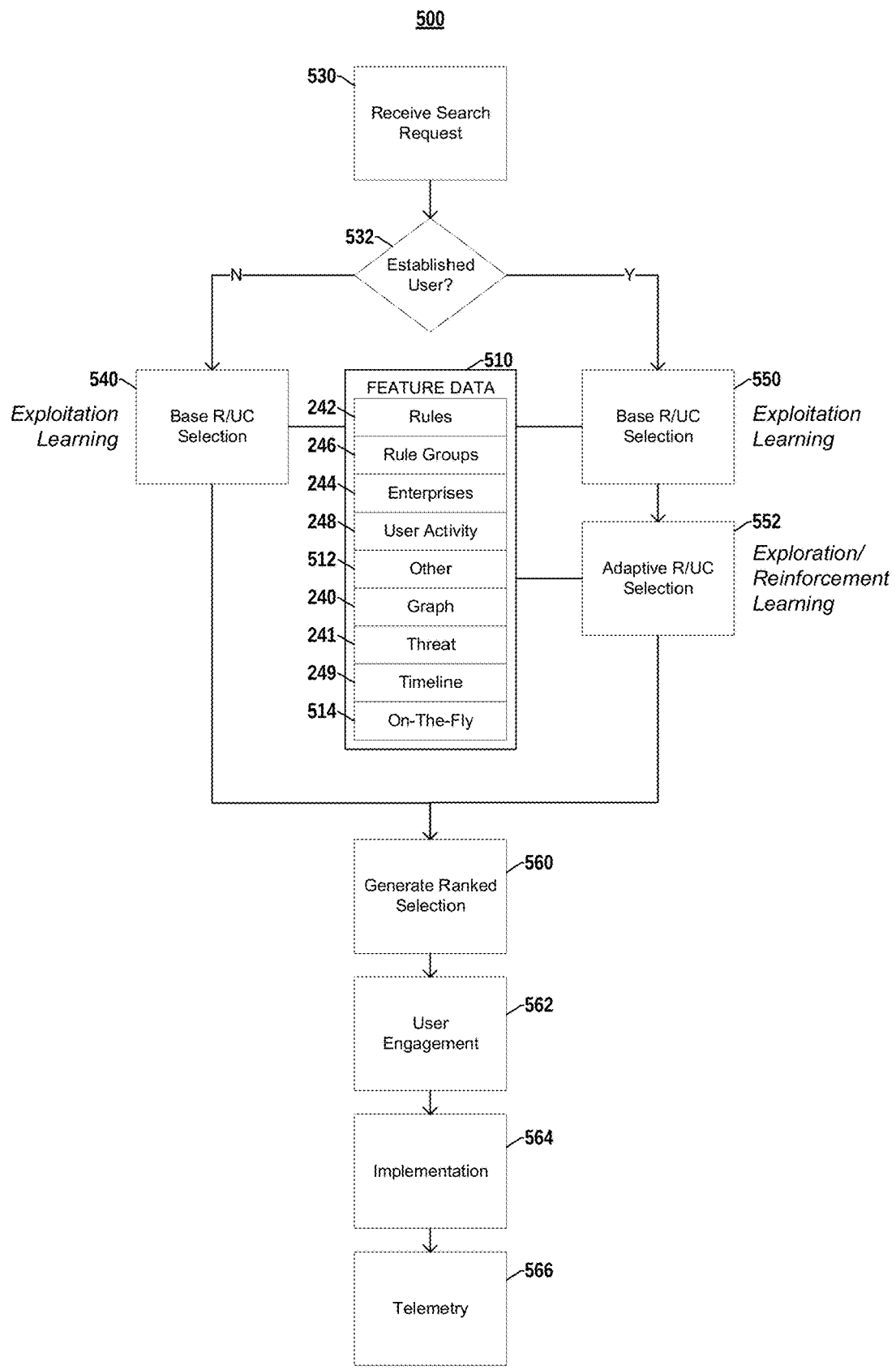
FIG. 5 is a search processing flow diagram of one embodiment.

FIG. 5 is a search processing flow diagram of one embodiment. Processing flow 500 begins at block 530 or processing is performed to receive a search request. The processing performed at block 530 parallels the processing described for block 420 of FIG. 4, where reception of a search request via a user interface or API exposed, for example, by functionality of enterprise interface 128 of FIG. 2 was discussed. The processing of block 532 of FIG. 5 then picks up with what would begin the processing represented by block 422 of FIG. 4, previously discussed. At block 532 of FIG. 5, processing is performed to determine whether the enterprise or user originating the search request is sufficiently established. The determination made at block 532 will control whether a single mode of selection processing is used to produce the customized selection set for the user or whether dual modes of selection processing are used to produce the customized selection set. Because the second of the dual modes of rules set selection in the example embodiment being discussed and described in relation to FIG. 5 needs a certain amount of accumulated usage history data from the subject enterprise to produce a valuable result, the determination made at block 532 is used to circumvent the second of the dual modes where adequate feedback data has not been accumulated. In one embodiment, the determination is made by assessing telemetry feedback data from the enterprise such as site telemetry feedback datastore 254 of FIG. 2. In one embodiment, the determination is made by assessing interaction feedback data from the enterprise such as user activity data 248 produce by interaction miner 134 of FIG. 2. In one embodiment, the determination is made by assessing immediate or intra-session user interface feedback data such as may exist in site rules/use-case feedback datastore 250 of FIG. 2. Many embodiments are possible and an embodiment may utilize some combination of any one or more of the aforementioned feedback data sources and/or other feedback data sources. In one embodiment, the determination of block 532 of FIG. 5 as to adequacy of the available feedback data needed to consider a user an established user includes making some assessment of the amount of feedback data as may be measured in bytes, records, transactions, or any other useful quantity metric. In one embodiment, the determination of block 532 as to adequacy of the available feedback data needed includes making some assessment of some temporal extent of feedback data. For example, an assessment or determination may be made as to whether feedback data has been accumulated for a period of time measured in minutes, hours, days, weeks, months, or more. For example, in one embodiment, an assessment or determination may be made as to the recency of data collection and whether, for example, feedback data has been collected for the most recent period of time measured minutes, hours, days, weeks, months, or more.

In an embodiment, the determination of block 532 as to the adequacy of available feedback data may combine considerations of data volume, temporal factors, and other factors. Many embodiments are possible. In an embodiment, the determination made at block 532 may chiefly address whether the types, quantities, and qualities, of available feedback data in respect of an enterprise and/or in respect of the greater subscriber community are an adequate levels to support a conditional mode of rule set selection. If a determination is made at block 532 that the user is established, perhaps in an also established community, processing shown to proceed to block 550 to begin dual-mode processing. If not, processing is shown to proceed to block 540 where single mode processing may begin. A CDS including functionality such as represented by block 532 has the advantage of being able to produce useful results for a "cold start" subscriber who may be able to benefit from the extensive cybersecurity knowledge in the aggregate of data known to the CDS, but is too new to take advantage of all available rule selection processing.

At block 540, processing is performed to effect a base selection process of rules either independently of, or in association with, use-cases. The processing of block 540 is such as may be performed by a base rule/user case selection processor 122 of CDS 202 of FIG. 2. In one embodiment, the processing of block 540 includes the performance of the logic that implements exploitation AI/ML learning modes to identify a selection set of one or more rules estimated to be of high value if deployed in the subscriber SIEM. The processing of block 540 may draw on a wide variety of training and learning feature data 510 maintained by the CDS, including for example rules database 242, ruled groups database 246, enterprise profiles database 244, user activity database 248, security knowledge graph 240, shared timeline 249, on-the-fly generated data 514 such as dynamically created cohort groups, and other data 512 as may be useful. In an embodiment, the processing of block 540 may generally be characterized by supervised learning processes carried out by program logic that effects some set of statistical and/or machine learning data processing procedures that contribute to the creation of a set of high value SIEM rules customized by subscriber-specific considerations. In an embodiment, the statistical and/or machine learning data processing procedures may be applied against some combination of static preferences and priorities as may be reflected in an entry of an enterprise profile database, and dynamic action data recognized and captured by the CDS in the course of interactions with user. Embodiments are possible.

In the exploitation processing of block 540, a CDS may deploy statistical and machine-learning processes to preferentially select rules and use-cases based on, for example, static threat priorities and preferences, platform activity such as rules liked and disliked, terms searched, and other factors. These processes identify rules that match a learned profile of enterprise interests, or are similar rules and use-cases based on trusted-group behavior and signals from the behaviors one or more identified sets of peers. Identification of a set of peers may be based on explicit identifications, such as industry groups; learned groupings, such as may be produced by cluster analysis and scoring; or other grouping criteria, such as geographic, industry verticals, and others. Categories used for other grouping criteria such as geographic may be predefined in an embodiment, but group definitions and membership may be dynamically determined, perhaps by performing logic that implements AWL methods. Many embodiments are possible.

In one embodiment, the processing of block 540 may include generating a preferred rule selection set based on established content. In one embodiment, generation of such a preferred rule selection set may include computing modified Jaccard similarity of a rule feature vector, perhaps derived from rules database 242, and an enterprise feature vector, perhaps derived from enterprise profile database 244. In one embodiment, the enterprise feature vector may be constructed by reference to security knowledge graph 240 and shared timeline 249 wherein all enterprise relationships that do not use behavior in the graph are added to the enterprise feature vector. In one parallel embodiment, cosine similarity scoring replaces Jaccard similarity. Embodiments including an enterprise feature vector may inherently identify useful enterprise cohorts that may not be readily recognized by traditional human analysis of the same or similar source data. Embodiments may vary as to the content of feature vectors and scoring methods, and many embodiments are possible.

In an embodiment, the processing of block 540 may include generating a preferred rule selection set based on data available about collaborators or likely collaborators. In such an embodiment, an identification of similar groups or cohorts, or rules/use-case candidates for a preferred list, is based on shared interests and group member behaviors. In one embodiment, the processing of block 540 includes performing logic that effects matrix factorization wherein the interests and dislikes of an enterprise account are derived based on other similar enterprise or trusted group interests, likes, and dislikes. Embodiments may vary, and similarly useful results may be achieved by effecting single value decomposition, nonnegative matrix factorization, or alternating least square processing against the feature data characterizing perhaps group interests, preferences, and/or behaviors.

The processing of block 540 may include processing to integrate a number of independently generated preferred rule selection sets that were perhaps generated by different approaches. In one such embodiment, each of the independent approach implementations produces a normalized or normalizable score for each rule in its set. The sets are combined, sorted by their normalized scores, and perhaps filtered to select some subset, such as some number of the highest scoring rules with duplicates eliminated. In one such embodiment, the sets from the independent approaches are combined, each rule is subjected to a scoring process, and the scored list is perhaps filtered to again select some subset. Many embodiments are possible.

The processing of block 540 is produced a rule selection set, processing proceeds to block 560. If at block 532 it was determined that the user is an established user, processing proceeded to block 550, rather than block 540. Block 550 of FIG. 5 begins processing for the dual-mode of rule selection processing. Dual-mode rule selection processing begins with the same exploitation learning of single mode rule selection processing, and the processing of block 550 may be identical or nearly identical to the processing just described for block 540. Dual-mode rule selection processing, however, also includes an exploration or reinforcement learning phase represented by block 552.

At block 552, processing is performed to effect an adaptive selection process to identify as set of rules, either independently of, or in association with, use-cases. The processing of block 552 is such as may be performed by an adaptive rule/user case selection processor 124 of CDS 202 of FIG. 2. In one embodiment, the processing of block 552 includes the performance of the logic that implements exploration and/or reinforcement AWL learning models to identify a selection set of one or more rules estimated to be of high value if deployed in the subscriber SIEM. The processing of block 552 may draw on a wide variety of feature data 510 maintained by the CDS, including for example rules database 242, rule clusters database 246, shared timeline 249, threat research 241, enterprise profiles database 244, user activity database 248, security knowledge graph 240, on-the-fly generated data 514 such as dynamically created cohort groups, other data 512 as may be useful, and site rule/use-case feedback data such as seen in datastore 250 of FIG. 2. In an embodiment, the processing of block 552 of FIG. 5 may generally be characterized by exploration and reinforcement learning processes carried out by program logic that effects some set of control optimization data processing procedures that optimize objective function in the creation of a set of high value SIEM rules/use-cases customized by subscriber-specific considerations. In one embodiment, the processing of block 552 includes exercising program logic that effects a recurrent neural network to incorporate temporal an enterprise account is stork information. The processing of block 552 may include exercising program logic that effects an exploration-based learning system. In one embodiment, such a learning system may implement logic for a transition model that internally refers to a probability estimator function. In one embodiment, the transition model may be described in terms of Markov decision process elements and may include a state space that is a continuous enterprise account state space, an action space that is a discrete action space containing rules and use-cases, a state transition probability obtained from a probability estimator function, a reward function for each state transition, and a policy that projects a distribution over rules/use-cases to recommend an action (i.e., rule/use-case) from the action space with respect to the enterprise account state.

In one embodiment, the probability estimator function may make its determinations of probability values based on one or more factors selected from among sequential past states of an account, affinity scores produced during the creation of a rule clusters dataset, such as dataset 246 of FIG. 2, policy corrections, and other factors. Many embodiments are possible. In one embodiment, a policy gradient, such as gradient ascent, is applied by programming logic to eliminate undesirable effects as may be caused by a maximization problem.

In one embodiment, the action set is pruned based on the inverse-propensity score of an action for the account state. In one such embodiment, the pruning may also be conditioned on feedback received or harvested regarding the most recent, or N most recent, learning-produced rule selection sets. Such feedback may be explicitly provided by a user in the form of likes/dislikes or such, or inferred from user actions and behaviors such as selecting or ignoring a rule. Many embodiments are possible.

In an embodiment, hypergraphs may be used during the exploration processing of block 552, and elsewhere, to achieve greater processing efficiency. Related combinations of particular nodes of the security knowledge graph may be highly useful in identifying a worthwhile rule. In use, rather than navigating and considering each of the member nodes that is subsumed by a hypergraph, only a single hypergraph node that consolidates its subsumed nodes needs to be considered, leading to reduced computing resource consumption while exploring by use of the graph. Moreover, particular hypergraphs may be recognized as having high probative value (a strong signal) for identifying particularly worthwhile rules or use-cases, and again may speed the identification of a high-worth rule selection set, saving both time and computing resources. For example, one implementation may derive Adversary-Exploit-Technique hypergraphs and determine one risk score or other rating for the hypergraph. Then, when determining the probability for a new state based on actions, the single hypergraph "node" only needs to be navigated for consideration of its score, rather than each of its three underlying nodes.

In consideration of the foregoing, one of skill in the art will appreciate that an adaptive exploration mode used in the process of identifying a preferred rule selection set, as represented by block 552 of FIG. 5, may take advantage of a security knowledge graph to explore actions (i.e., rules and use-cases) and preferably select from among them based on enterprise identity (e.g., enterprise action history, enterprise context, group or cohort membership, industry participation), which preferred selection may produce rewards indicated by user activity such as a rule deployment into an active SIEM. Further one of skill will appreciate that and adaptive exploration mode used in the process of identifying a preferred rule selection set may, beyond the security knowledge graph, take advantage of enterprise interests indicated in shared timeline data, feedback provided by the enterprise for a rule's feature space, enterprise interest towards an entity cluster and exploring nearby rules, and enterprise interest toward security concepts and exploring nearby concepts. Feedback of such user actions is considered in subsequent iterations and may be given substantial weight, such that user action to ignore a highly ranked rule in a selection set may strongly decrease the probability of that rule, use-case, or similar rule or use-case, appearing in a subsequent selection set.

Processing proceeds from block 552 of FIG. 5 to block 560 where processing is performed to generate a ranked rule selection set. The processing of block 560 may be entered with a single rule selection set, or possibly with multiple rule selection sets. For example, if the processing of block 560 occurs subsequently to the processing of blocks 550 and 552, the processing of block 560 may be entered with one or more rule selection lists produced by exploitation learning as well as one or more rule selection lists produced by exploration/reinforcement learning. In an embodiment, the processing of block 560 may include processing to combine multiple rule selection sets into a single set. Many embodiments are possible, and illustrative examples have already been discussed in relation to the processing of block 540. Integral to such a process, or perhaps distinctly from it, processing of block 560 may include determining a ranking score for each of the rules in the nascent preferred selection set. In one embodiment, processing of block 560 may produce a rule risk score for each of the candidate rules in the nascent preferred selection set. In one embodiment, the rule risk score may be an integer value in the range of 1 through 10. In one embodiment, the rule risk score may be a real value in the range of 0 through 10. In one embodiment, the rule risk score may be a fractional value in the range of 0 through 1. Embodiments are possible. Embodiments may vary as to the factors included in the determination of a rule risk score. Embodiments may vary as to the method used to integrate multiple factors into the determination of a rule risk score. In an embodiment, a rule risk score may be represented by multiple simultaneous factors and reflected as a matrix or a vector. To simplify the discussion, the illustrative rule risk score discussed here is a single value, but one of skill in the art can readily understand how the discussion could be extended to multifactor representations. In one embodiment, author input factors may be used in the determination of a rule risk score. Such factors may include use-case impact scores, rule confidence scores, author assigned scores, author efficacy scores, kill chain phase values, and others. In one embodiment, community rating input factors may be used in the determination of a rule risk score. Such factors may include prevalence ratings user survey ratings, efficacy values, and others. In one embodiment, threat enrichment input factors may be used in the determination of a rule risk score. Such factors may include a vulnerability score is assigned to a CVE, a threat group rating, a kill chain phase value, an industry intelligence assigned score, and others. In one embodiment, SIEM factors may be used in the determination of a rule risk score. Such factors may include the number of generated events per use-case, the analyst FP/TP (false positive/true positive) ratio, and others. In an embodiment, any combination of the aforementioned factors and others may be used in the determination of a rule risk score. In an embodiment, varying combinations of factors may be used in the determination of a rule risk score based on conditions such as factor availability, for example. In such an embodiment, determination of the rule risk score includes logic to equalize or normalize values to maintain comparability when different combinations of factors are used to produce rule risk scores. Many embodiments are possible.

Having a ranking score, such as a rule risk score, assigned to each of the candidate rules, processing of block 560 may include logic to produce a final preferred rule selection set from the collection of candidate rules. In one embodiment, where a higher rule risk score indicates greater value to the enterprise for establishing a secure environment, the collection of candidate rules may be sorted in the order of descending rule risk score for ease of focusing on the most worthwhile rules. In such an embodiment, the sorted candidate rules may be filtered to maximize attention on the most important rules where, for example, the importance of the rule is attributed to its rule risk score. In one embodiment, the candidate rules may be filtered to select some maximum number of the highest scoring rules. In one embodiment, the candidate rules may be filtered to select only rules that meet or exceed a certain scoring level. Many embodiments are possible and any useful filtering criteria may be used. The processing of block 560 may ultimately conclude with the presentation of a finalized preferred rule selection set that may include some indication of ranking for the rules with respect to their determined value to the enterprise at improving operational cybersecurity, for example. In an embodiment, processing may then proceed to block 562.

At block 562, implementation processing for the preferred rule selection set begins for illustrated process 500 of FIG. 5. At block 562, processing is performed to solicit user engagement in the process of implementing the preferred rule selection set. In one embodiment, processing of block 562 may include presenting information about one or more rules of the preferred rule selection set to a user. In an embodiment, the information may be presented via a user interface such as a graphical user interface presented on the display screen of a terminal, computer, laptop, mobile device, or other apparatus. In an embodiment, the information may include an identification of the rule, information items associated with the rule or describing the rule, an indicator of the preferred or recommended status of the rule and any other desired information. In an embodiment, a user interface display such as depicted and discussed in relation to FIG. 9 may be employed.

The processing of block 562 may serve the functions of informing, the user such as an SOC analyst, of the rules identified in the preferred rule selection set. In an embodiment, the processing of block 562 may engage the user only to provide information about a preferred rule selection set that will be unconditionally implemented by deployment in the enterprise SIEM. In an embodiment, the processing of block 562 may engage the user to perform an important gating function in the stream of implementation processing. In such an embodiment, user engagement processing of block 562 may also include functionality to give a human user control over factors such as the selection and timing of the actual deployment in the SIEM of the rules identified in the preferred rule selection set. For many enterprises, including a human-driven gating function at some point along the automatic implementation processing stream for the preferred rule selection set is essential for compliance with internal, and external industry, contract, and government guidelines, requirements, and regulations. Embodiments may vary as to particular methods employed to achieve a human-driven gating function, and examples include opt-in, opt-out, and specific authorization modes or methods. Many embodiments are possible. After certain processing of block 562, the preferred rule selection set, in whole or in part, may be passed on the processing of block 564.

At block 564, processing is performed to insert, install, deploy, or otherwise implement one or more rules of the preferred rule selection set into active operation in the SIEM of the subscriber enterprise. After active implementation of the one or more rules, data regarding their utilization and produced results, for example, may be served back to the CDS by the processing of telemetry block 566.

Figure 6:
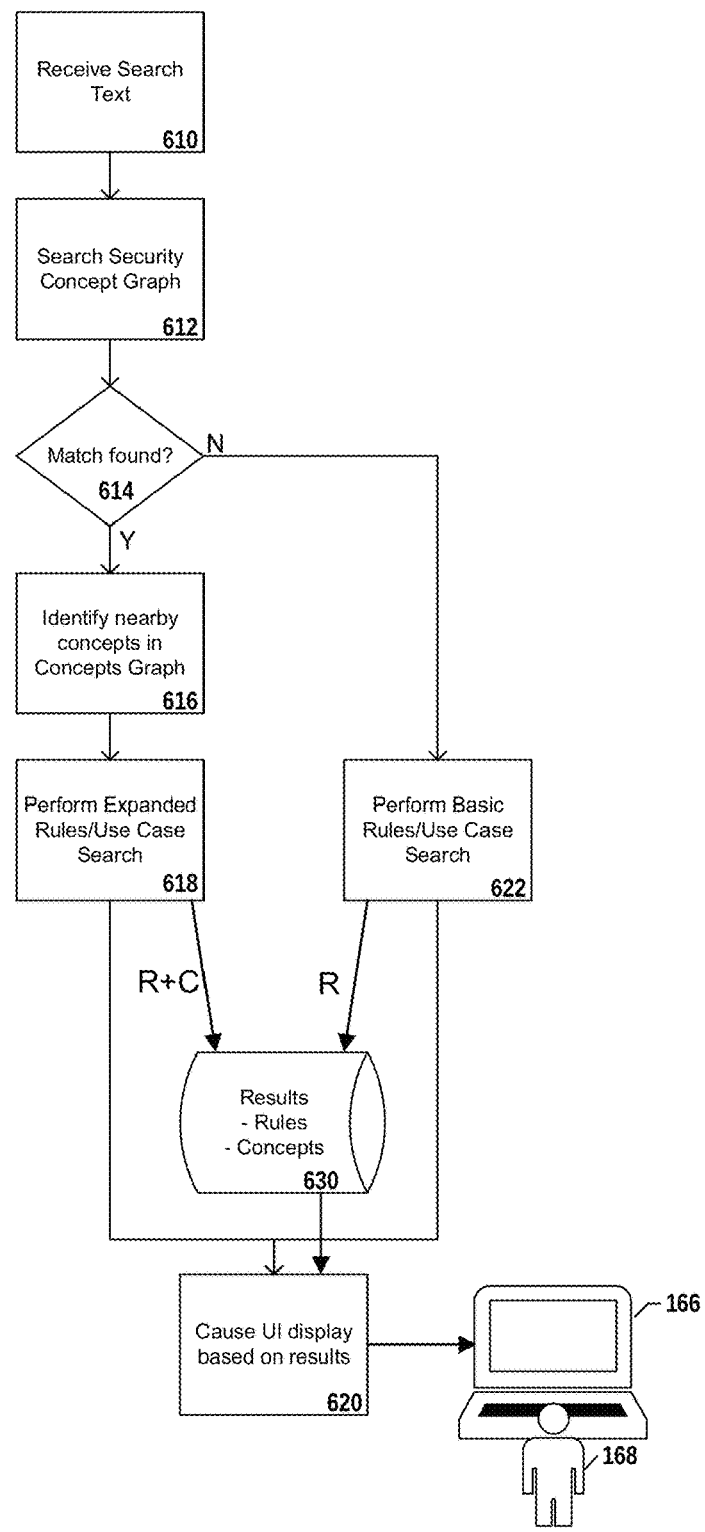
FIG. 6 is a search processing flow diagram of one embodiment with an express concepts-based expanded search.

FIG. 6 is a search processing flow diagram of one embodiment with an express concepts-based expanded search. The processing shown for process flow 600 is such as might be performed for the processing of block 422 of FIG. 4 as earlier discussed. Illustrative process flow 600 of FIG. 6 is shown to begin at block 610 where the text representing the search argument is received by the computing machine. At block 612, the security concept graph is searched using the text argument received at block 610. At block 614, determination is made whether a match, reasonably approximate match, or closest match was found in the security concept graph as the result of the processing of block 612. If not, processing proceeds to block 622 where basic search processing is performed to identify a preferred set of rules which are represented in computer storage as results data 630. If so, processing proceeds to block 618 where processing is performed for an expanded rule/use-case search. In an embodiment, the expanded search includes identifying candidate rules for the preferred selection set not only directly associated with the instant security concept and/or search argument, but also those associated with other security concepts having some threshold degree of logical proximity to the instant security concept and/or search argument. In such an embodiment, the processing logic represented by block 618 may navigate a graph of security concept nodes, such as node 327 of FIG. Three, that are related in such a way as that their logical proximity is easily determined. Rules associated with security concepts of sufficient proximity may then be identified and considered his candidate rules for the expanded search. Such a search is expanded in the sense that candidate rules are not limited to those in direct association with the immediate security concept, but extend to rules in indirect association via related security concepts. Many embodiments are possible. Expanded search processing of block 618 of FIG. Six is shown to include both the preferred set of rules identified by its processing as well as security concepts used in the expanded search in results 630. After the production of search results 630, processing proceeds to block 620 were a user interface is caused to be displayed based at least in part on the content search results 630. Process flow 600 of FIG. Six is shown to indicate that the processing of block 620 results in the user interface display appearing on user interface device 166. The user interface display does the result of the processing of block 620 may appear as user interface display 1000 of FIG. 10, for example. Many embodiments are possible. One of skill will appreciate how certain processing already described in relation to FIGS. Five could be used to implement or augment the processing described in relation to FIGS. Six, and vice versa. Multiple embodiments are discussed as an aid in describing the applicability of inventive aspects and the multiple embodiments are generally complementary and not mutually exclusive.

Figure 7:
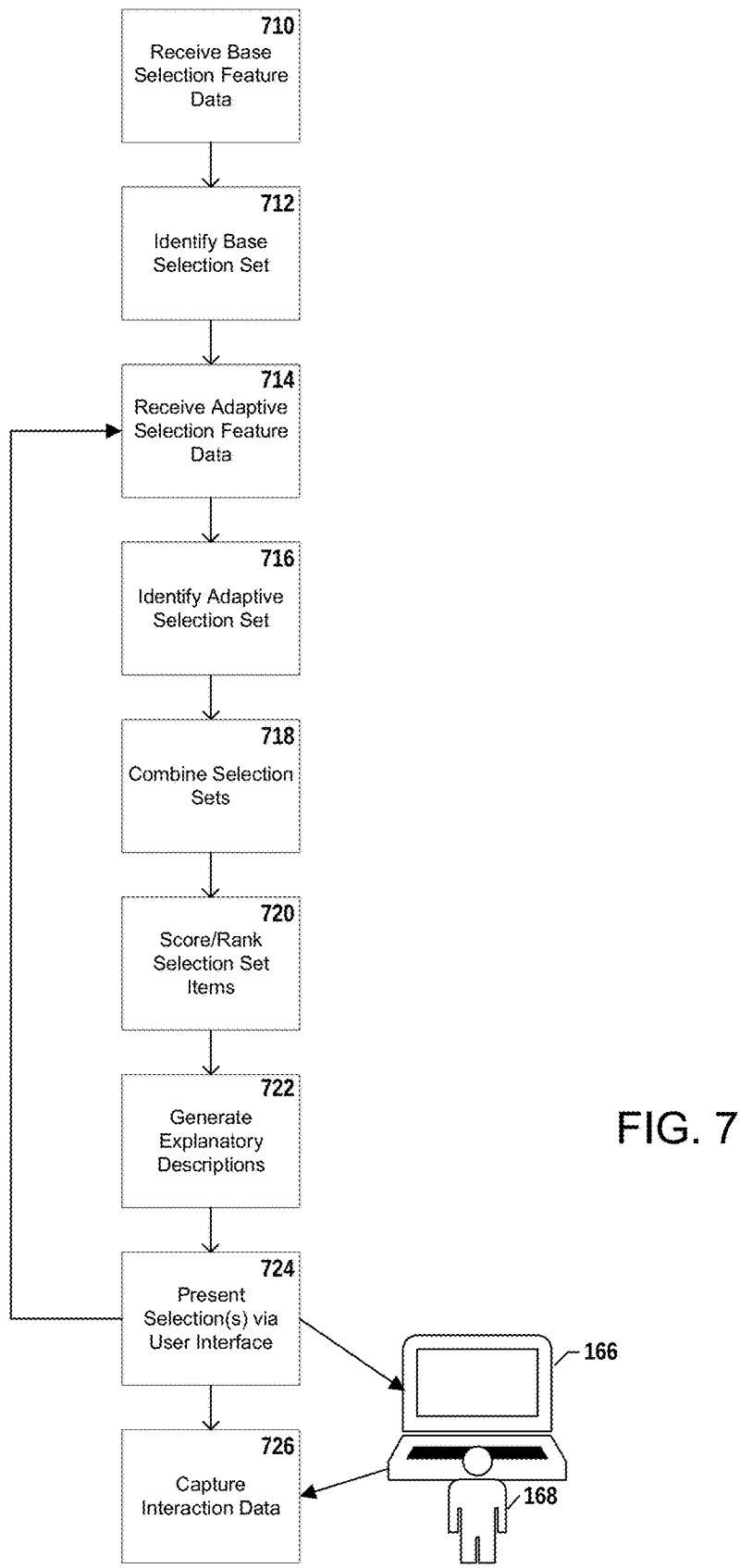
FIG. 7 is a search processing flow diagram of one embodiment.

FIG. 7 is a search processing flow diagram of one embodiment. As an embodiment of search flow processing, there is overlap between the functional processing represented in process flow 700 of FIG. 7 and the functional processing already described in relation to process flow 500 of FIG. 5. After consideration of the discussions related to both FIG. 5 and FIG. 7, one of skill will appreciate such correspondence as may exist between, for example: the processing described in relation to blocks 540 and 550 of FIG. 5 and the processing described in relation to block 710 and 712 of FIG. 7; the processing described in relation to block 552 of FIG. 5 and the processing described in relation to blocks 714 and 716 of FIG.; The processing described in relation to block 560 of FIG. 5 and the processing described in relation to blocks 718 and 720 of FIG. 7; the processing described in relation to block 562 of FIG. 5 and the processing described in relation to block 724 of FIG. 7.

Blocks 710 and 712 of process flow 700 of FIG. 7 relate to exploitation learning as may be performed, for example by a base selection processor such as 122 of CDS 202 of FIG. 2. At block 710 of FIG. 7, processing is performed to receive into working computer memory the feature data used to perform exploitation learning processes. Receiving such data into working computer memory may include receiving, accessing, copying, loading, acquiring, or any other data processing operation useful for making the subject data readily available for computer processing in the current operational computing context. At block 712, processing is performed to identify a base rule selection set. In an embodiment, such processing may emphasize the performance of logic that effects or supports exploitation learning techniques.

Blocks 714 and 716 of process flow 700 of FIG. 7 relate to exploration and reinforcement learning as may be performed, for example, by an adaptive selection processor such as 124 of CDS 202 of FIG. 2. At block 714 of FIG. 7, processing is performed to receive into working computer memory the feature exploration and reinforcement learning processes. At block 716, processing is performed to identify and adaptive rule selection set. In an embodiment, such processing may emphasize the performance of logic that effects or supports explorational and/or reinforcement learning techniques. Processing may then advance to block 718.

Blocks 718, 720, and 722, relate to preferred rule selection set optimization him as may be performed, for example, by a selection optimizer such as selection optimizer 126 of CDS 202 of FIG. 2. At block 718 of FIG. 7, processing is performed as needed to combine multiple selection sets. In one embodiment, for example, the processing of block 718 combines a rule selection set that emerges from the processing of block 712 with a rule selection set that emerges from the processing of block 716. The combining operations of block 718 may include sorting, merging, integrating, duplicate removing, filtering, and other data processing operations as may be useful to produce a single list of candidate rules for inclusion in a final preferred rule selection set. At block 720, processing is performed as needed to determine and/or utilize a score or rank value for the candidate rules for possible inclusion in the final preferred rule selection set. If the candidate rules enter the processing of block 720 already having an associated score useful for ranking the candidate rules relative to one another, possibly according to a value indicative of the worth of the rule to the enterprise with respect to reducing the risk and improving the security of the operational computing environment of the enterprise, then the processing of block 720 in an embodiment may include no more than sorting the list in accordance with the ranking score, and/or filtering the list using some meaningful criteria that preferably emphasizes the set of rules offering the greatest improvement to the security of the enterprise operating environment by some measure. At block 722, processing is performed to generate human readable explanatory descriptions which provide indications of the criteria that allowed a rule to be included in the preferred rule selection set. For example, the explanatory description for a rule may indicate, "90% behavior match; 40% industry match." As another example, the explanatory description for a rule may indicate, "Matched Threat Priorities: 2, Efficacy: 87, Rating 4" or "Trending Exploits: Ryuk, Trending Adversaries: APT41" or "1 of your trusted groups rated the rule as excellent."

At block 724, processing is performed to present information regarding one or more of the rules of the preferred rule selection set to a user 168, such as an SOC analyst, via a user interface device 166. The processing of block 724 may include iterative processing such that a sequence of presentations are made to the user, interleaved with operations to receive user input entered via user interface device 166. In an embodiment, certain information available based on the user interaction processing performed at block 724, such as user actions to accept, reject, like, dislike, deploy, or ignore a rule, may undergo feedback processing such that they are available, for example to the processing of block 714, for subsequent determinations of preferred rule selection sets. This and other information available based on user interaction processing may be captured at block 726 and stored for future use. The processing of block 726 is such as may be performed by interaction miner 134 of CDS 202 of FIG. 2.

6.0. Interface Examples

Figure 8:
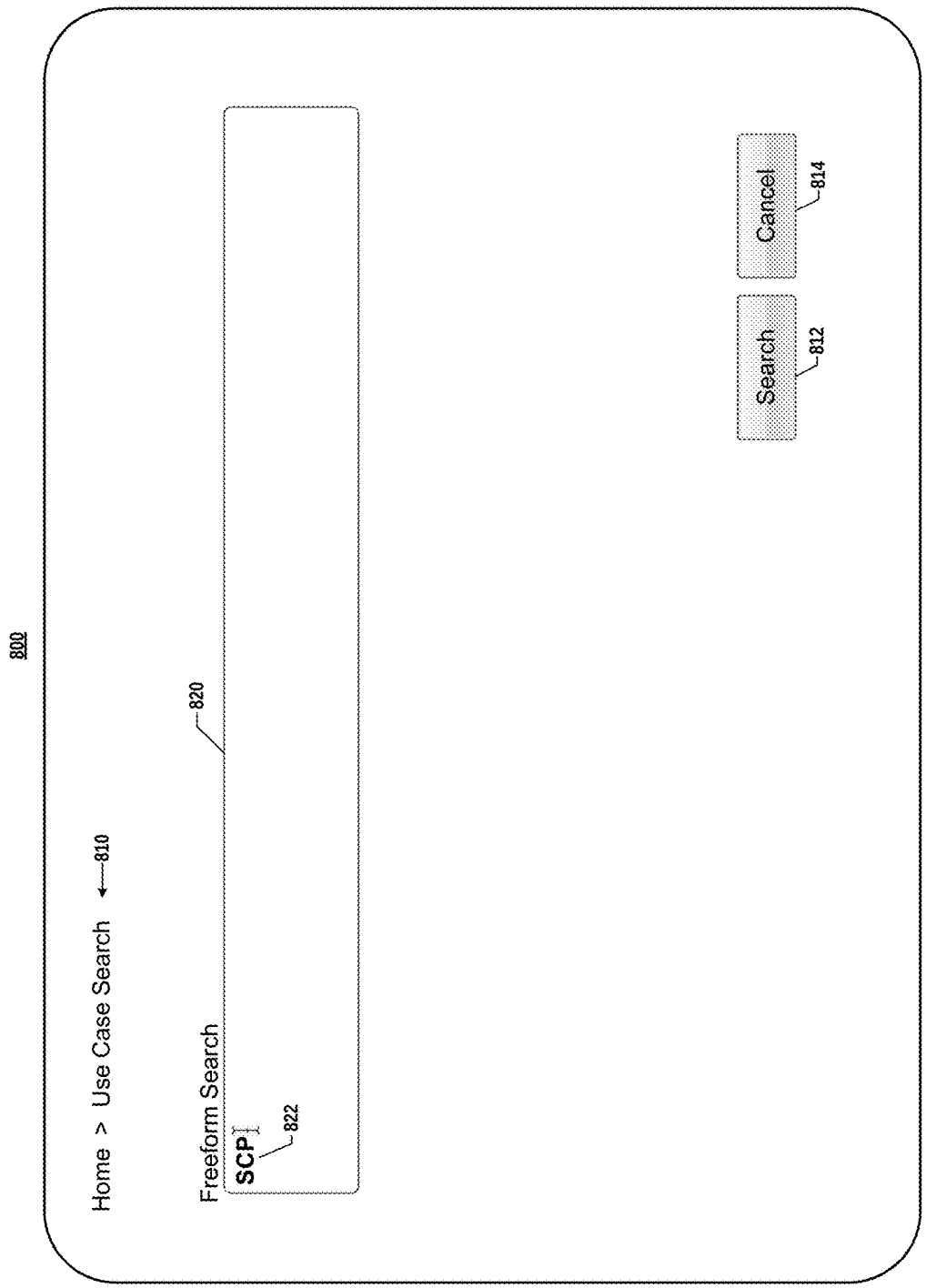
FIG. 8 depicts a user interface display for search processing in one embodiment.

FIG. 8 depicts a user interface display for search processing in one embodiment. Display 800 is shown to include navigation line 810, user entry text box 820, search command button 812, and cancel command button 814. Navigation line 810 is a non-interactive text label use to indicate a user's location within a user interface navigation scheme. Here, the value "Home>Use-case Search" indicates that display 800 is for a Use-case Search functional interface to which the user navigated from a Home display screen. User entry text box 820 is an interactive text box enabling a user to enter text representing search terms, criteria, parameters, or such as may be used to initiate a search in a CDS system such as CDS 202 of FIG. 2. User entry text box 820 of display 800 of FIG. 8 is shown to include the user entered text value, or search term, "SCP" 822. Search command button 812 is an interactive button enabling a user to signal or indicate a desire to initiate search processing using the search criteria 822 present in user entry text box 820. User interaction with command button 812 is communicated to the CDS which, in an embodiment, may initiate a search for perhaps rules or use-cases based at least in part on the user provided search term "SCP." Cancel command button 814 is an interactive button enabling a user to signal or indicate a desire to terminate processing related to display 800. User interaction with command button 814 is communicated to the CDS which, in an embodiment, may respond by terminating the presentation of user interface display 800 and causing it to be replaced with a display of a Home screen display.

Figure 9:
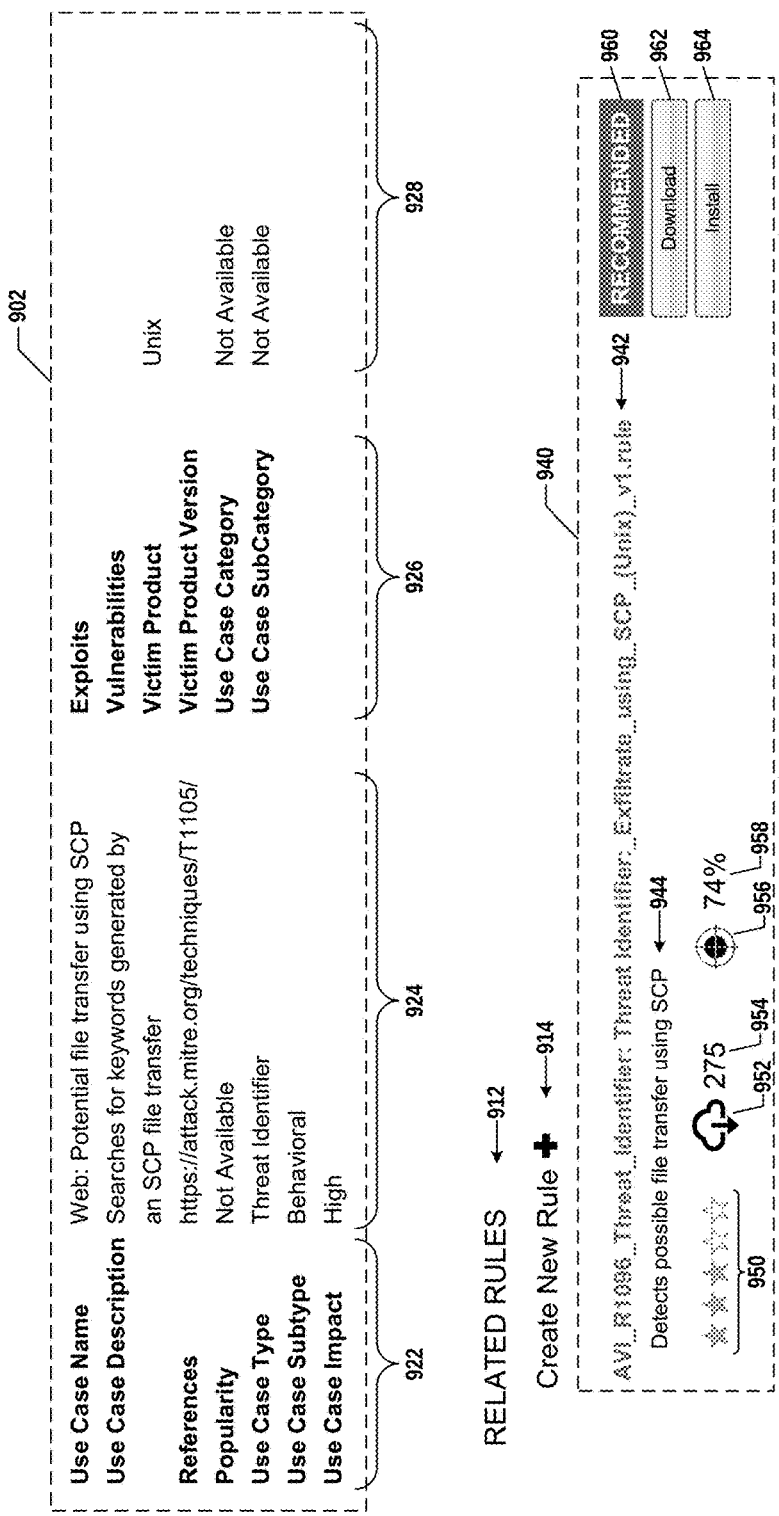
FIG. 9 depicts a user interface display for use-case and rule processing in one embodiment.

FIG. 9 depicts a user interface display for use-case and rule processing in one embodiment. In one CDS embodiment, display 900 of FIG. 9 is such a display as might appear after search processing is produced a preferred rule selection list. User interface display 900 is shown to include navigation line 910, use-case information display area 902, section heading 912, action line 914, and rule information display area 940. Use-case information display area 902 is shown to further include first field name column 922, first field values column 924, second field name column 926, and second field values column 928. Rule information display area for 940 is shown to include rule identifier 942, rule description 944, star rating 950, download icon 952, download count 954, effectiveness score indicator 956, effectiveness score value 958, status indicator 960, download command button 962, and install command button 964.

Navigation line 910 is a non-interactive text label use to indicate a user's location within a user interface navigation scheme. Here, the value "Home>All Use-cases>AVL_UC1065" indicates that display 900 is for the display of a use-case identified as "AVL_UC1065" which is subordinate to an All Use-cases displays to which a user can navigate from a Home display screen. Use-case information display area 902 is used to present information about the subject use-case, AVL_UC1065.

First field name column 922 presents and columnar fashion a set of field names for field reflecting information about the subject use-case. The field names of column 922 include: "Use-case Name" with the corresponding value in column 924 of "Web: Potential file transfer using SCP"; "Use-case Description" with the corresponding value in column 924 of "Searches for keywords generated by an SCP file transfer"; "References" with the corresponding value in column 924 of "h***s://attack.mitre.org/techniques/T1105/"; "Popularity" with the corresponding value in column 924 of "Not Available"; "Use-case Type" with the corresponding value in column 924 of "Threat Identifier"; "Use-case Subtype" with the corresponding value in column 924 of "Behavioral"; and "Use-case Impact" with the corresponding value in column 924 of "High". Second field name column 926 may be effectively considered a continuation of first field name column 922, and presents in columnar fashion a set of field names for fields reflecting information about the subject use-case. The field names of column 926 include: "Exploits"; "Vulnerabilities"; "Victim Product" with the corresponding value in column 928 of "Unix"; "Victim Product Version"; "Use-case Category" with the corresponding value in column 928 of "Not Available"; and "Use-case SubCategory" with the corresponding value in column 928 of "Not Available".

Section heading 912 indicates the title for a section of the information display that follows and displays the value "RELATED RULES". Action line 914 is an interactive action item that enables a user to indicate a desire to create a new rule to be associated with the subject use-case. User interaction with the "+" symbol of action line 914 signals the user desire to the CDS whereby the CDS may navigate to a user interface display that supports the creation of a new rule.

Rule information display area 940 contains the display of interactive elements related to a particular rule associated with the subject use-case identified at 910. Rule information display area 940 is shown to include: rule identifier 942 which is a text box for displaying the name of an SIEM rule, here designated as "AVI_R1096_Threat_Identifier: Threat Identifier:_Exfiltrate_using_SCP_(Unix)_v1.rule"; rule description 944 which is a text box for displaying a description of the identified rule, here showing "Detects possible file transfer using SCP"; star rating 950 which is an interactive control group enabling a user to indicate a 0 to 5 star rating for the identified rule, or which is a noninteractive control group displaying to the user an indication of a 0 to 5 star rating from a community source, here indicating a three star rating; download icon 952 is a noninteractive graphical element indicating the idea of downloads; download count 954 is a noninteractive text box indicating the number of times the rule has been downloaded by a CDS subscriber, here showing the value "275"; effectiveness score indicator 956 is a noninteractive graphical element indicating the idea of "on target" effectiveness; effectiveness score value 958 is a non-interactive text box indicating the effectiveness score associated with the subject rule, here showing the value "74%". Status indicator 960 is a non-interactive text box indicating a status related to the subject rule, here showing "RECOMMENDED" indicating that the subject rule was identified in a preferred rule selection list. Download command button 962 is an interactive command button enabling a user to signal or indicate a desire to download the subject rule from the CDS to the SIEM system. User interaction with command button 962 is communicated to the CDS which, in an embodiment, may initiate downloading of the rule to the subscribers SIEM system. Install command button 964 is an interactive command button enabling a user to signal or indicate a desire to install the subject rule into the STEM system of the subscriber. User interaction with command button 964 is communicated to the CDS which, in an embodiment, may initiate a process to install the rule into the subscribers SIEM.

Figure 10:
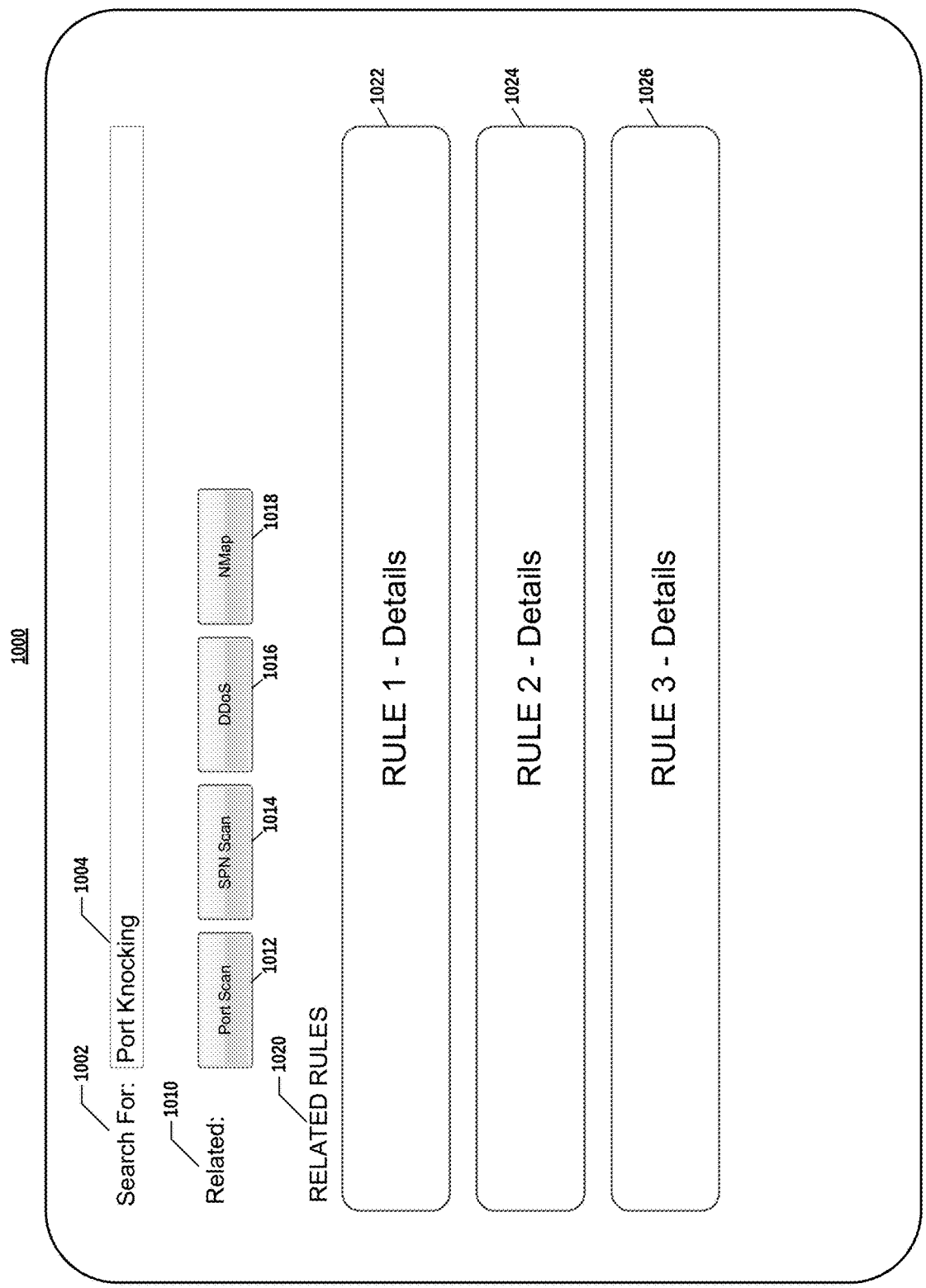
FIG. 10 depicts a user interface display for use-case and rule processing in one embodiment including security concept information.

FIG. 10 depicts a user interface display for use-case and rule processing in one embodiment including security concept information. In one CDS embodiment, display 1000 of FIG. 10 is such a display as might appear after search processing has produced a preferred rule selection list. Display 1000 is such a display as might appear as a result of the processing of block 620 of FIG. 6, for example. User interface display 1000 of FIG. 10 is shown to include search text box label 1002, search text box 1004, security concept items label 1010, security concept elements 1012, 1014, 1016, 1018, rules area label 1020, and rule elements 1022, 1024, and 1026.

Search text box label 1002 is shown to display the text "Search For:" signifying that search text box 1004 is for the purpose of entering the text of a search argument. Search text box 1004 is shown to include search argument text "Port Knocking." Security concept items label 1010 is shown to display the text "Related:" signifying that user interface elements 1012-1018 represent security concepts related to the search argument appearing in text box 1004. User interface elements 1012-1018 are depicted as interactive button controls perhaps suggesting that in an embodiment user interaction with one of the elements may signal processing for a subsequent action, such as a search using the concept represented by the element as the search argument. Many embodiments are possible. The concepts represented by elements 1012-1018 may have been identified by the expanded search processing of block 618 of FIG. 6, for example. Interface element 1012 of FIG. 10 is shown to display the text identifying the security concept "Port Scan." Interface element 1014 is shown to display the text identifying the security concept "SPN Scan." Interface element 1016 is shown to display the text identifying the security concept "DDoS." Interface element 1018 is shown to display the text identifying the security concept "NMap."

Rules area label 1020 is shown to display the text "RELATED RULES" signifying that interface elements 1022, 1024, 1026 represent rules related to the search argument appearing in text box 1004. The rules represented by elements 1022, 1024, 1026 may have been identified by the expanded search processing of block 618 of FIG. 6 or by the basic search processing of block 622 of FIG. 6, for example. In an embodiment, interface elements 1022, 1024, 1026 may be interactive elements whereby user interaction with one of the elements may signal processing for subsequent action, such as displaying detailed information about the rule represented by the element. In one embodiment, each of interface elements 1022, 1024, 1026, may represent a display region that may be substantially populated as is area 940 of FIG. 9, for example. Many embodiments are possible. As depicted in FIG. 10, interface element 1022 displays the text "RULE 1—Details", interface element

1024 displays the text "RULE 2—Details", and interface element 1026 displays the text "RULE 3—Details."

7.0. Example Embodiments and Advantages

In consideration of the disclosure herein, one of skill in the art appreciates many inventive aspects and modes, methods, and mechanisms of their deployment in useful ways with clear advantages. Some examples follow.

In an embodiment, a centralized multi-subscriber, multi-enterprise, multi-party, multi-organization, or multi-entity data service or platform is implemented benefiting individual members in search of high value SIEM rules/use-cases for its computing environment by leveraging computer encoded knowledge derived from public sources and the experiences, configurations, actions, behaviors, and feedback of other members.

In an embodiment, a computer readable and processable security knowledge graph links multiple layer constructs to provide advanced cross referencing among nodes, direct and indirect, to enable identification of high scoring and recommendable rules/use-cases for a system member. Embodiments may include layers such as adversary, TTP framework, infrastructure, vulnerability, rule, industry, member/enterprise account behavior, threat intelligence, and security concept layers.

In an embodiment, given a text value, such as a search term or use-case name, a security knowledge graph may be beneficially employed to derive a security concept graph with semantically same or different, but conceptually similar, nodes that have a measure of closeness to the text value.

In an embodiment, a security knowledge graph may be beneficially employed to recommend threat scenarios and/or related threat identifiers most relevant to an enterprise based on usage across enterprises having a measure or determination of similarity to the enterprise.

In an embodiment, timelines of actions and events for each of multiple members/enterprises are maintained. Directly or indirectly using a text value of interest to an enterprise, such as a search term, the timelines of multiple enterprises may be explored for temporal relationships that ultimately identify potentially high value rules/use-cases.

In an embodiment, a computing platform is implemented to identify commendable, high value rules/use-cases using explorational processing of established and maintained data sets and constructs. Such an embodiment may employ processing logic to effect automated forms of supervised learning and/or exploration.

In an embodiment, identification of high value rules/use-cases may include consideration of factors that codify or represent observed, measured, or reported likes/dislikes of cohorts or similar cohorts. In such an embodiment, the action space may be pruned based on factors including inverse-propensity score, or enterprise input regarding the recommendation score of items in the action set (such as feedback regarding increases or decreases), for example.

In an embodiment, processing to identify high value rules/use-cases for an enterprise, as well as information regarding the enterprise's interaction with the identified matter (such as deploying an identified rule) may indicate properties or characteristics of the enterprise. For example, identification and user deployment of a particular rule may indicate a particular threat priority attributable to the user. In such an embodiment, such learned information about the user may be used to update the user/enterprise profile, either automatically or with user confirmation via a user interface interaction, for example.

In an embodiment, processing logic may be implemented and exercised to identify groups of users/members/enterprises having a determined commonality, such as similar or likely similar detection priorities. In one embodiment, commonality may be determined in whole or in part by factors such as commonly used search terms, collaboration keywords, expressed interests, and SIEM commands/language. In an embodiment, an enterprise may be added to a such an identified peer group automatically or after user confirmation via a user interface interaction, for example.

In an embodiment, a community detection model to detect rule clusters/communities may be constructed, given mappings among texts and rules/use-cases. Such an embodiment has the advantage of allowing similar texts to also contribute rules to the cluster.

In an embodiment, the selection, determination, or identification of high value rules/use-cases in an instance may consider factors including the identity or attributes of an enterprise, and the membership of rules in rule clusters. Rule clusters may be created in an embodiment by determining some measure of closeness between and among a collection of rules.

In an embodiment, data representations of rules in a system may be enhanced with additional tag or attribute information. The additional tag or attribute information may be determined automatically by processing to identify, determine, or measure similarity or commonality of a rule with one or more other rules. In an embodiment, such processing may be preferentially targeted at rules having fewer associations or cross-references, such as fewer mappings to texts. In an embodiment, determining similarity may include consideration of the rule text and any other information of the data representation of the rule, or other information found indirectly thereby.

In an embodiment, rule clusters may have associations with peer groups determined and recorded automatically.

In an embodiment, explanations for including a rule/use-case in a high value set may be based on selected features and their respective values that contributed to the inclusion of the rule/use-case.

Many embodiments are possible, and many advantages are understood by one of skill in the art, far beyond the foregoing set of examples.

8.0. Computing System Architecture

Figure 11:
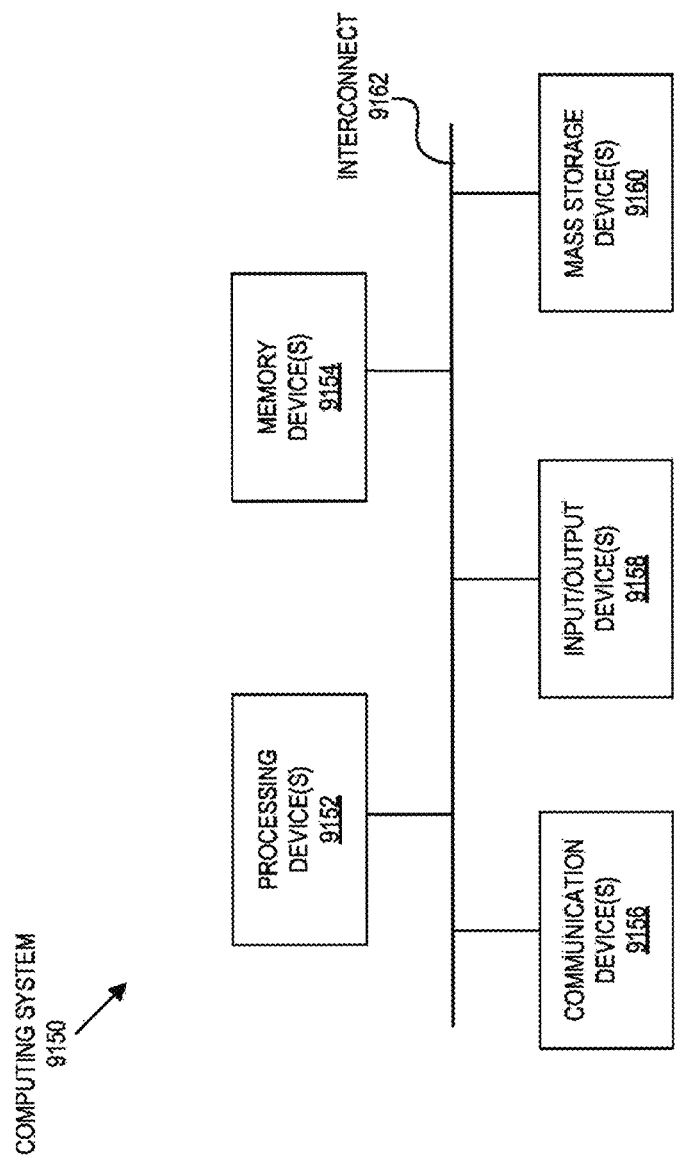
FIG. 11 is a block diagram illustrating a high-level example of a hardware architecture of a computing system in which an embodiment may be implemented.

FIG. 11 is a block diagram illustrating a high-level example of a hardware architecture of a computing system in which an embodiment may be implemented. For example, the hardware architecture of a computing system 9150 can be used to implement any one or more of the functional components described herein (e.g., networked computer systems 110 and 160 of FIG. 1). The computing system 9150 can also be used to implement any of a dataset builder 136, graph builder 12, timeline builder 137, adaptive R/UC selection processor 124, and such, of FIG. 2, a datastore, or a computing resource. In some embodiments, one or multiple instances of the computing system 9150 can be used to implement the technologies described herein, where multiple such instances can be coupled to each other via one or more networks. Examples include networked computer system 110, and system 100 of FIG. 1.

The processes and logic flows described in this specification can be performed by one or more programmable processors executing one or more computer programs to perform functions by operating on input data and generating output. For example, the computing system 9150 includes one or more processing devices 9152, one or more memory devices 9154, one or more communication devices 9156, one or more input/output (I/O) devices 9158, and one or more mass storage devices 9160, all coupled to each other through an interconnect 9162.

The interconnect 9162 may be or include one or more conductive traces, buses, point-to-point connections, controllers, adapters, and/or other conventional connection devices. Each of the processing devices 9152 controls, at least in part, the overall operation of the processing of the computing system 9150 and can be or include, for example, one or more general-purpose programmable microprocessors, digital signal processors (DSPs), mobile application processors, microcontrollers, special purpose logic circuitry, e.g., a field programmable gate array (FPGA) or an application specific integrated circuit (ASIC), or the like, or a combination of such devices.

Each of the memory devices 9154 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 9160 can be or include one or more hard drives, digital versatile disks (DVDs), flash memories, or the like. Each memory device 9154 and/or mass storage device 9160 can store (individually or collectively) data and instructions that configure the processing device(s) 9152 to execute operations to implement the techniques described above.

Processors suitable for the execution of a computer program include, by way of example, both general and special purpose microprocessors, and any one or more processors of any kind of digital computer (e.g., 9152). Generally, a processor will receive instructions and data from a read-only memory or a random access memory or both. The essential elements of a computer are a processor for performing instructions and one or more memory devices for storing instructions and data. Generally, the computer system 9150 will also include, or be operatively coupled to receive data from or transfer data to, or both, one or more mass storage devices for storing data, e.g., magnetic, magneto optical disks, or optical disks. However, a computer need not have such devices.

Each communication device 9156 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 9152, each I/O device 9158 can be or include a device such as a display (which may be a touch screen display), audio speaker, keyboard, mouse or other pointing device, microphone, camera, etc. Note, however, that such I/O devices 9158 may be unnecessary if the processing device 9152 is embodied solely as a server computer.

The computing system 9150 can include clients or servers. A client and server are generally remote from each other and typically interact through a communication network. The relationship of client and server arises by virtue of computer programs running on the respective computers and having a client-server relationship to each other. In the case of a client device, the communication devices(s) 9156 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 9156 can be or include, for example, any of the aforementioned types of communication devices, a wired Ethernet adapter, cable modem, DSL modem, or the like, or a combination of such devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

A software program or algorithm, when referred to as "implemented in a computer-readable storage medium," includes computer-readable instructions stored in a memory device (e.g., memory device(s) 9154). A processor (e.g., processing device(s) 9152) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® or LINUX®) or a specific software application, algorithm component, program, object, module, or sequence of instructions referred to as "computer programs."

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a datastore management system, an operating system, or a combination of one or more of them, a propagated signal is an artificially generated signal, e.g., a machine generated electrical, optical, or electromagnetic signal, that is generated to encode information for transmission to suitable receiver apparatus.

A computer program (also known as a program, software, software application, script, or code) typically includes one or more instructions set at various times in various memory devices of a computing device, which, when read and executed by at least one processor (e.g., processing device(s) 9152), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 9154).

A computer program can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The computer system 9150 can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor (e.g., processing devices 9152) and the memory (e.g., memory device 9154) can be supplemented by, or incorporated in, special purpose logic circuitry.

To provide for interaction with a user, architecture provider or reviewer, embodiments of the subject matter described in this specification can be implemented with a display device of the I/O devices 9158, e.g., a CRT (cathode ray tube) to LCD (liquid crystal display) monitor, for displaying information to the user and a keyboard and a pointing device, e.g., a mouse or a trackball, by which the user can provide input to the computer. Other kinds of I/O devices 9158 can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

In some embodiments, the computing system 9150 can include a back end component (not shown), e.g., as a data server, or that includes a middleware component, e.g., an application server, or that includes a front end component, e.g., a client computer having a graphical user interface (e.g., metrics-aware UI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

9.0. Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

All of the processes and steps described above as may be performed and fully automated by a computer system. The computer system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. A processor may include one or more processors of one or more computing devices. A memory may include one or more distinct memory devices or apparatus each operably coupled to a processor in whole or in part. The various identification and marketing service functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Systems and modules described herein may comprise software, firmware, hardware, or any combinations of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Similarly, various components of the illustrated systems can be implemented in other virtualization constructs, such as one or more containers (operating-system-level virtualizations) within a containerization framework like Docker by Docker, Inc., perhaps facilitated with a container orchestration facility like the open source Kubernetes, both widely known. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed:

1. A method comprising:
   causing the display of a UI enabling a user to indicate a cybersecurity search specification;
   receiving user input comprising an indication of the cybersecurity search specification;
   searching a security knowledge graph for SIEM-executable rules for processing the cybersecurity search specification, the security knowledge graph comprising a rule layer, an enterprise behavior layer, and a tactics/techniques/procedures (TTP) framework layer;
   identifying a first set of one or more SIEM-executable rules corresponding to the cybersecurity search specification, from a plurality of SIEM-executable rules concerning multiple, separate enterprises, responsive to searching the security knowledge graph;
   identifying a second set of one or more STEM-executable rules, responsive to searching the security knowledge graph, the second set of rules being associated with security concepts within a specific threshold degree of logical proximity to the first set of rules based on positions of corresponding nodes in the security knowledge graph;
   causing the display of a UI indicating at least one rule of the first identified set of rules and at least one rule of the second identified set of rules, the UI enabling the user to indicate an implementation option for displayed rules;
   receiving second user input comprising an indication of an implementation option;
   causing the performance of processing based at least in part on the indication of the implementation option.

2. The method of claim 1 wherein causing the display of a UI includes causing a network communication between a cross-enterprise facility and an enterprise facility.

3. The method of claim 1 wherein receiving user input comprising an indication of the search specification includes receiving information via a network communication between a cross-enterprise facility and an enterprise facility.

4. The method of claim 1 wherein the implementation option is further enabled for user indication by the UI indicating a first rule is downloading a rule.

5. The method of claim 1 wherein the processing based at least in part on the indication of an implementation option includes processing to cause the download of a rule.

6. The method of claim 1 further comprising enterprise profile data including at least one from among preference information, deployed security product information, and user action information.

7. The method of claim 1 wherein the rule layer comprises node information representing a rule and node information representing a use case.

8. The method of claim 1 wherein the enterprise behavior layer comprises information associating an enterprise search with at least one from among an adversary and a technique.

9. The method of claim 1 wherein the TTP framework layer comprises node information representing an exploit, node information representing a technique, and information associating the exploit with the technique.

10. The method of claim 1 further comprising an exploration model including propensity and inverse-propensity based scoring to determine candidate rules or use-cases for search results.

11. The method of claim 1 further comprising an exploration model including consideration of a shared timeline of events to determine search results.

12. The method of claim 1 further comprising an exploration model including consideration of a security concept layer to determine search results.

13. A system comprising:
   a processor;
   a memory coupled to the processor having instructions that when executed perform operations including:
   causing the display of a UI enabling a user to indicate a cybersecurity search specification;
   receiving user input comprising an indication of the cybersecurity search specification;
   searching a security knowledge graph for SIEM-executable rules for processing the cybersecurity search specification, the security knowledge graph comprising a rule layer, an enterprise behavior layer, and a tactics/techniques/procedures (TTP) framework layer;
   identifying a first set of one or more SIEM-executable rules corresponding to the cybersecurity search specification, from a plurality of SIEM-executable rules concerning multiple, separate enterprises, responsive to searching the security knowledge graph;
   identifying a second set of one or more STEM-executable rules, responsive to searching the security knowledge graph, the second set of rules being associated with security concepts within a specific threshold degree of logical proximity to the first set of rules based on positions of corresponding nodes in the security knowledge graph;
   causing the display of a UI indicating at least one rule of the first identified set of rules and at least one rule of the second identified set of rules, the UI enabling the user to indicate an implementation option for displayed rules;
   receiving second user input comprising an indication of an implementation option;
   causing the performance of processing based at least in part on the indication of the implementation option.

14. The system of claim 13 wherein causing the display of a UI includes causing a network communication between a cross-enterprise facility and an enterprise facility.

15. The system of claim 13 wherein receiving user input comprising an indication of the search specification includes receiving information via a network communication between a cross-enterprise facility and an enterprise facility.

16. The system of claim 13 wherein the rule layer comprises node information representing a rule and node information representing a use case.

17. The system of claim 13 wherein the enterprise behavior layer comprises information associating an enterprise search with at least one from among an adversary and a technique.

18. The system of claim 13 wherein the TTP framework layer comprises node information representing an exploit, node information representing a technique, and information associating the exploit with the technique.

19. The system of claim 13 further comprising an exploration model including propensity and inverse-propensity based scoring to determine candidate rules or use-cases for search results.

20. A non-transitory computer readable storage medium encoding instructions thereon that, in response to execution by one or more processing devices, cause the one or more processing devices to perform operations comprising:
   causing the display of a UI enabling a user to indicate a cybersecurity search specification;
   receiving user input comprising an indication of the cybersecurity search specification;
   searching a security knowledge graph for SIEM-executable rules for processing the cybersecurity search specification, the security knowledge graph comprising a rule layer, an enterprise behavior layer, and a tactics/techniques/procedures (TTP) framework layer;
   identifying a first set of one or more SIEM-executable rules corresponding to the cybersecurity search specification, from a plurality of SIEM-executable rules concerning multiple, separate enterprises, responsive to searching the security knowledge graph;
   identifying a second set of one or more STEM-executable rules, responsive to searching the security knowledge graph, the second set of rules being associated with security concepts within a specific threshold degree of logical proximity to the first set of rules based on positions of corresponding nodes in the security knowledge graph;
   causing the display of a UI indicating at least one rule of the first identified set of rules and at least one rule of the second identified set of rules, the UI enabling the user to indicate an implementation option for displayed rules;
   receiving second user input comprising an indication of an implementation option;
   causing the performance of processing based at least in part on the indication of the implementation option.

* * * * *